US011853306B2

(12) United States Patent
Katukuri et al.

(10) Patent No.: US 11,853,306 B2
(45) Date of Patent: Dec. 26, 2023

(54) TECHNIQUES FOR PERSONALIZING APP STORE RECOMMENDATIONS

(71) Applicant: Apple Inc., Cupertino, CA (US)

(72) Inventors: Jayasimha R. Katukuri, San Jose, CA (US); Peter Leong, Mountain View, CA (US); Chandrasekar Venkataraman, Palo Alto, CA (US); Rabi S. Chakraborty, San Jose, CA (US); Hardik Vala, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 515 days.

(21) Appl. No.: 16/147,058

(22) Filed: Sep. 28, 2018

(65) Prior Publication Data

US 2019/0370345 A1 Dec. 5, 2019

Related U.S. Application Data

(60) Provisional application No. 62/679,949, filed on Jun. 3, 2018.

(51) Int. Cl.
*G06F 16/48* (2019.01)
*G06F 16/9535* (2019.01)
(Continued)

(52) U.S. Cl.
CPC .......... *G06F 16/24578* (2019.01); *G06F 8/60* (2013.01); *G06F 16/287* (2019.01);
(Continued)

(58) Field of Classification Search
CPC .. G06F 16/24578; G06F 16/287; G06F 16/48; G06F 16/9535; G06F 8/60;
(Continued)

(56) References Cited

U.S. PATENT DOCUMENTS 6,615,208 B1 * 9/2003 Behrens ............. G06Q 30/0631
707/754
6,907,423 B2 * 6/2005 Weil .................... G06F 16/9535
707/999.009

(Continued)

FOREIGN PATENT DOCUMENTS

| CN | 103514496 A | 1/2014 |
| CN | 103907107 A | 7/2014 |
| CN | 107423442 A | 12/2017 |

OTHER PUBLICATIONS

Chinese Patent Application No. 201910447549.8—First Office Action dated Oct. 19, 2022.

*Primary Examiner* — Mark D Featherstone
*Assistant Examiner* — Navneet Gmahl
(74) *Attorney, Agent, or Firm* — DICKINSON WRIGHT RLLP

(57) ABSTRACT

Disclosed herein is a technique for providing software application recommendations to a user of a computing device. The technique can include: (1) receiving, from the computing device, a request for at least one software application recommendation, (2) identifying, among a plurality of user profiles, a user profile associated with the user, (3) accessing a plurality of software application profiles (SAPs), wherein each SAP of the plurality of SAPs is associated with a respective software application managed by the server computing device, (4) analyzing the user profile against a subset of the plurality of SAPs to identify, among the respective software applications associated with the subset of the plurality of SAPs, at least one software application to recommend, (5) associating the at least one software application recommendation with the at least one software application, and (6) causing the computing device to display the at least one software application recommendation.

20 Claims, 15 Drawing Sheets

(51) Int. Cl.
    *G06F 16/2457*    (2019.01)
    *G06F 8/60*       (2018.01)
    *G06N 20/00*      (2019.01)
    *G06F 16/28*      (2019.01)

(52) U.S. Cl.
    CPC .......... *G06F 16/48* (2019.01); *G06F 16/9535* (2019.01); *G06N 20/00* (2019.01)

(58) Field of Classification Search
    CPC . G06F 8/61; G06N 20/00; G06N 5/02; G06N 5/04
    See application file for complete search history.

(56) References Cited

U.S. PATENT DOCUMENTS

| | | | |
|---|---|---|---|
| 8,015,140 B2 | 9/2011 | Kumar et al. | |
| 8,156,059 B2 | 4/2012 | Dunning et al. | |
| 8,185,533 B2 | 5/2012 | Martin et al. | |
| 8,312,017 B2 | 11/2012 | Martin et al. | |
| 8,601,003 B2 | 12/2013 | Gates et al. | |
| 8,886,583 B2 | 11/2014 | Fukazawa et al. | |
| 9,215,423 B2 | 12/2015 | Kimble et al. | |
| 9,449,339 B2* | 9/2016 | Jackson | G06Q 30/0631 |
| 9,460,461 B1* | 10/2016 | Gill | G06Q 30/0641 |
| 9,613,118 B2* | 4/2017 | Whitman | G06F 16/735 |
| 10,069,705 B2* | 9/2018 | Zalmanovitch | H04L 43/0876 |
| 10,728,106 B1* | 7/2020 | Hartley | H04L 12/4641 |
| 11,385,892 B1* | 7/2022 | Zhang | G06F 16/9535 |
| 11,422,797 B1* | 8/2022 | Zhang | G06F 8/72 |
| 2002/0138479 A1* | 9/2002 | Bates | G06F 16/3322 |
| | | | 707/999.005 |
| 2003/0055819 A1* | 3/2003 | Saito | G06F 16/3322 |
| 2005/0131872 A1* | 6/2005 | Calbucci | G06F 16/3338 |
| 2008/0222105 A1* | 9/2008 | Matheny | G06F 16/9535 |
| 2010/0050211 A1* | 2/2010 | Seldin | H04N 21/4532 |
| | | | 725/46 |
| 2010/0138402 A1* | 6/2010 | Burroughs | G06F 16/3344 |
| | | | 707/723 |
| 2010/0293057 A1* | 11/2010 | Haveliwala | G06Q 30/0269 |
| | | | 705/14.66 |
| 2010/0333037 A1* | 12/2010 | Pavlovski | G06F 3/0481 |
| | | | 715/848 |
| 2011/0264656 A1* | 10/2011 | Dumais | G06F 16/9537 |
| | | | 707/765 |
| 2011/0307354 A1* | 12/2011 | Erman | G06Q 30/0282 |
| | | | 705/27.1 |
| 2011/0320307 A1* | 12/2011 | Mehta | G06Q 30/0641 |
| | | | 705/26.7 |
| 2012/0096435 A1* | 4/2012 | Manolescu | G06F 8/60 |
| | | | 717/121 |
| 2012/0259826 A1* | 10/2012 | Zalila-Wenkstern | |
| | | | G06F 16/954 |
| | | | 707/706 |
| 2012/0303477 A1 | 11/2012 | Ben-Itzhak | |
| 2012/0316955 A1* | 12/2012 | Panguluri | G06Q 30/06 |
| | | | 707/706 |
| 2013/0013408 A1* | 1/2013 | Hjelm | G06F 16/9535 |
| | | | 707/706 |
| 2013/0159320 A1* | 6/2013 | Gao | G06F 16/9535 |
| | | | 707/748 |
| 2013/0185291 A1* | 7/2013 | Tyndall | G06F 16/9535 |
| | | | 707/723 |
| 2014/0052542 A1* | 2/2014 | Zhang | G06Q 30/0269 |
| | | | 705/14.66 |
| 2014/0120981 A1* | 5/2014 | King | G06V 30/1423 |
| | | | 455/556.1 |
| 2014/0279216 A1* | 9/2014 | Desmarais | G06Q 30/0633 |
| | | | 705/26.8 |
| 2014/0280350 A1* | 9/2014 | Liu | G06F 16/9535 |
| | | | 707/793 |
| 2015/0081695 A1* | 3/2015 | Schillings | G06F 16/9535 |
| | | | 707/736 |
| 2015/0082183 A1* | 3/2015 | Hale | H04W 4/21 |
| | | | 715/738 |
| 2015/0120742 A1 | 4/2015 | Liu et al. | |
| 2015/0242750 A1* | 8/2015 | Anderson | G06Q 30/0631 |
| | | | 706/50 |
| 2015/0249673 A1* | 9/2015 | Niemoeller | H04W 4/50 |
| | | | 726/4 |
| 2015/0286650 A1* | 10/2015 | Stump | G06Q 50/01 |
| | | | 705/319 |
| 2015/0294029 A1* | 10/2015 | Sanghai | G06F 16/90328 |
| | | | 707/732 |
| 2015/0310526 A1* | 10/2015 | Warren | G06F 16/248 |
| | | | 705/26.62 |
| 2016/0012559 A1* | 1/2016 | Patterson | G06F 16/9535 |
| | | | 705/328 |
| 2016/0162942 A1* | 6/2016 | Evans | G06F 16/24 |
| | | | 705/14.53 |
| 2016/0246790 A1* | 8/2016 | Cowdrey | G06F 16/24578 |
| 2016/0291969 A1* | 10/2016 | Chien | H04L 67/306 |
| 2017/0060872 A1* | 3/2017 | Sacheti | G06F 16/9535 |
| 2017/0215024 A1* | 7/2017 | Pang | H04L 67/22 |
| 2018/0101576 A1* | 4/2018 | Lin | G06F 16/9535 |
| 2018/0321825 A1* | 11/2018 | Martineli | H04M 1/72469 |
| 2019/0050930 A1* | 2/2019 | Andrew | G06Q 30/0201 |
| 2019/0391898 A1* | 12/2019 | Vichare | G06F 9/44505 |
| 2020/0034357 A1* | 1/2020 | Panuganty | G06F 16/243 |

\* cited by examiner

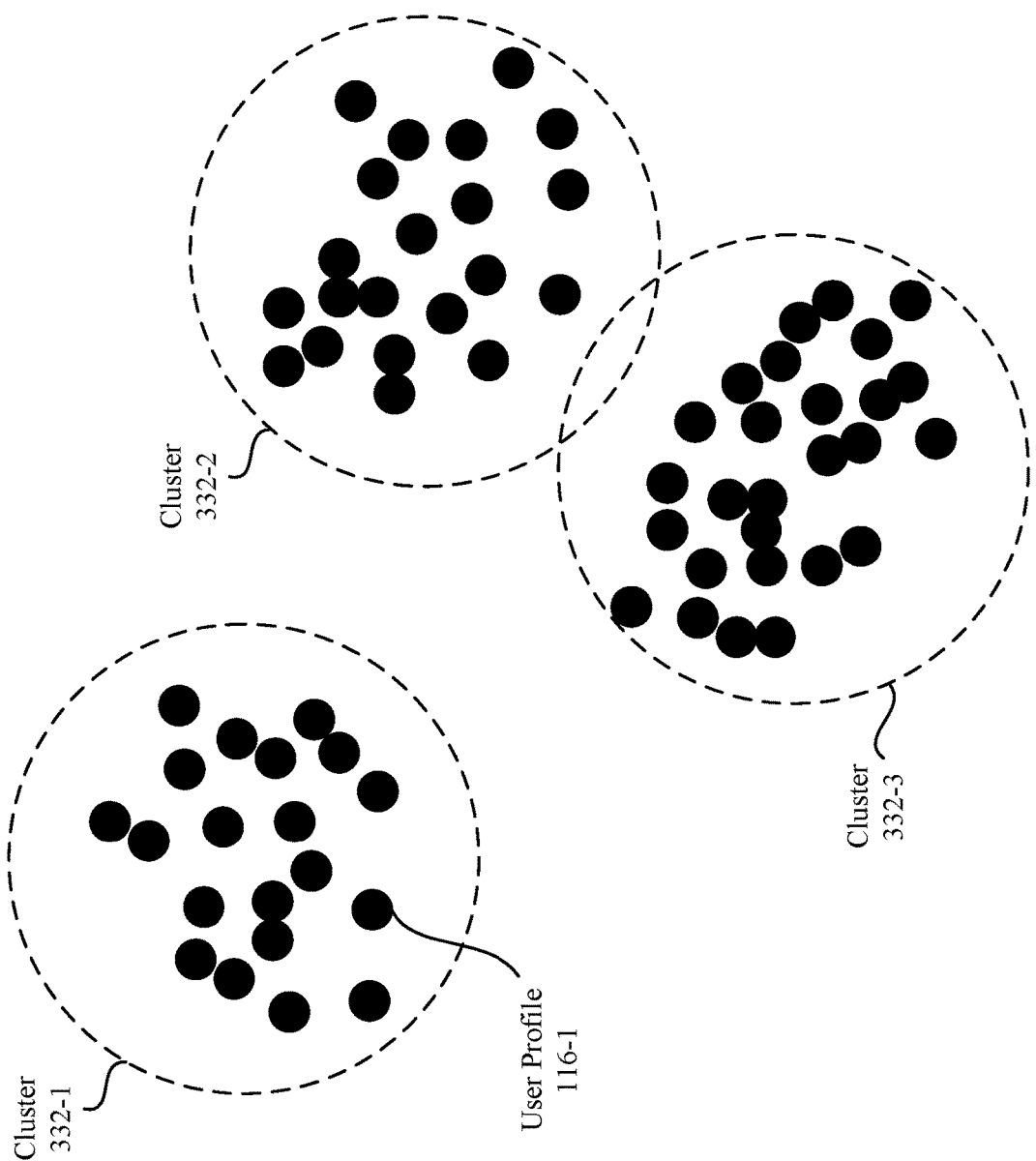

TECHNIQUES FOR PERSONALIZING APP STORE RECOMMENDATIONS

CROSS-REFERENCE TO RELATED APPLICATIONS

The present application claims the benefit of U.S. Provisional Application No. 62/679,949, entitled "TECHNIQUES FOR PERSONALIZING APP STORE RECOMMENDATIONS," filed Jun. 3, 2018, the content of which is incorporated herein by reference in its entirety for all purposes.

FIELD

The described embodiments set forth techniques for providing personalized software application recommendations to a user who accesses a software application store using a computing device. In particular, the techniques provide a framework for maintaining information about various factors that can be considered when generating the personalized software application recommendations to ensure that they are relevant to the user.

BACKGROUND

Recent years have shown a proliferation in the number of individuals who own and operate computing devices (e.g., wearables, smartphones, tablets, etc.). Typically, an individual uses his or her computing device to carry out different types of activities throughout the day, e.g., placing phone calls, sending and receiving electronic messages, accessing the internet, and the like. In most cases, operating systems installed on the computing devices—in particular, native software applications that come pre-installed on the operating systems—can enable users to carry out the foregoing activities. However, third-party software applications can also be installed to enable the users to carry out additional/enhanced activities. For example, these software applications can include social network software applications, photo software applications, game software applications, and the like.

A common approach for enabling users of the computing devices to utilize software applications involves providing a software application store—referred to herein as an "app store"—that enables the users to download software applications onto their computing devices. In particular, the app store enables developers of software applications to upload their software applications to the app store along with descriptions, pricing information, screenshots, and the like. In turn, the users can utilize the app store to explore and install software applications that are useful/interesting to them. For example, the users can submit search queries with specific keywords for software applications they are interested in downloading, can view all software applications belonging to particular category in which they are interested (e.g., games), and so on. In another example, the app store can display software applications that are ranked according to various metrics—e.g., top-downloaded software applications, top-ranked software applications, etc.—to enable the users to identify software applications that are currently prevalent among all users.

Notably, the number of software applications offered by a given app store tends to scale in accordance with the popularity of the computing device platform on which the app store is based. For example, an app store for a highly-utilized computing device platform—e.g., one that involves millions of computing devices—tends to include a substantial number of software applications—e.g., on the order of several million—that are available to be downloaded. Although this abundance of software applications provides the benefit of enhanced flexibility and options to the users, it is also introducing new challenges that have yet to be addressed. In particular, the sheer number of software applications makes it difficult for a given user to navigate through the app store to identify software applications that suit his or her needs. In a similar vein, it is challenging to identify and present undiscovered software applications that the user might be interested in downloading. Moreover, the limited screen real-estate—well as attention span/patience the user—requires an additional distillation of the undiscovered software applications to be performed. In most cases, this distillation involves randomly excluding a considerable portion of the undiscovered software applications, which likely include software applications that the user might deem relevant.

Consequently, what is needed is an improved technique for providing meaningful software application recommendations to users of an app store.

SUMMARY

The described embodiments set forth techniques for providing personalized software application recommendations to a user who accesses a software application store using a computing device. In particular, the techniques provide a framework for maintaining information about various factors that can be considered when generating the personalized software application recommendations to ensure that they are relevant to the user.

One embodiment sets forth a method for providing software application recommendations that are relevant to a user of a computing device. According to some embodiments, the method can be implemented by a server computing device, and include the steps of: (1) receiving, from the computing device, a request for at least one software application recommendation to be displayed on the computing device, (2) identifying, among a plurality of user profiles, a user profile associated with the user, (3) accessing a plurality of software application profiles (SAPs), wherein each SAP of the plurality of SAPs is associated with a respective software application managed by the server computing device, (4) analyzing the user profile against a subset of the plurality of SAPs to identify, among the respective software applications associated with the subset of the plurality of SAPs, at least one software application to recommend to the user, (5) associating the at least one software application recommendation with the at least one software application, and (6) causing the computing device to display the at least one software application recommendation.

According to some embodiments, the server computing device can be configured to generate a software application profile (SAP) for a given software application by gathering, over a threshold period of time, information about one or more of: (i) user interaction information associated with the software application, (ii) derived information associated with the software application, (iii) usage information associated with the software application, or (iv) metadata information associated with the software application. According to some embodiments, the (i) user interaction information can identify one or more of: downloads, in-app purchases, ratings/reviews, demographics, search queries, or clicks/impressions associated with the software application. Moreover, the (ii) derived information can identify one or more of: ranking positions, a trending factor, a stability factor, compatibilities, or accolades associated with the software application. Additionally, the (iii) usage information can identify one or more of: a usage factor or an installation retention factor associated with the software application. Further, the (iv) metadata information can identify one or more of: curation information, metadata information, or tag information associated with the software application.

According to some embodiments, the server computing device can be configured to generate a user profile for a given user by gathering, over a threshold period of time, information about one or more of: (i) engagements by the user with a plurality of software applications, or (ii) demographics associated with the user. According to some embodiments, the (i) engagements by the user can identify one or more of: downloads, in-app purchases, ratings/reviews, search queries, or clicks/impressions associated with the user. Moreover, the (ii) the demographics associated with the user can identify one or more of: a gender or an age of the user.

Additionally, the embodiments set forth a method for refining software application search results based on a user profile associated with a user of a computing device. According to some embodiments, the method can be implemented by a server computing device, and include the steps of (1) receiving a query from the computing device, (2) refining the query to establish a refined query, (3) identifying, based on the refined query, a plurality of software applications among the software applications managed by the server computing device, (4) ordering the plurality of software applications based on the user profile to establish a ranked list of software applications, and (5) causing the computing device to display at least a subset of the ranked list of software applications in a search results window displayed on the computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 3A-3E illustrate conceptual diagrams of a manner in which user profiles for users can be generated and maintained, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for providing personalized software application recommendations to a user who accesses a software application store using a computing device. In particular, the techniques provide a framework for maintaining information about various factors that can be considered when generating the personalized software application recommendations to ensure that they are relevant to the user. A more detailed discussion of these techniques is set forth below and described in conjunction with the various accompanying FIGS., which illustrate detailed diagrams of systems and methods that can be used to implement these techniques.

Figure 1:
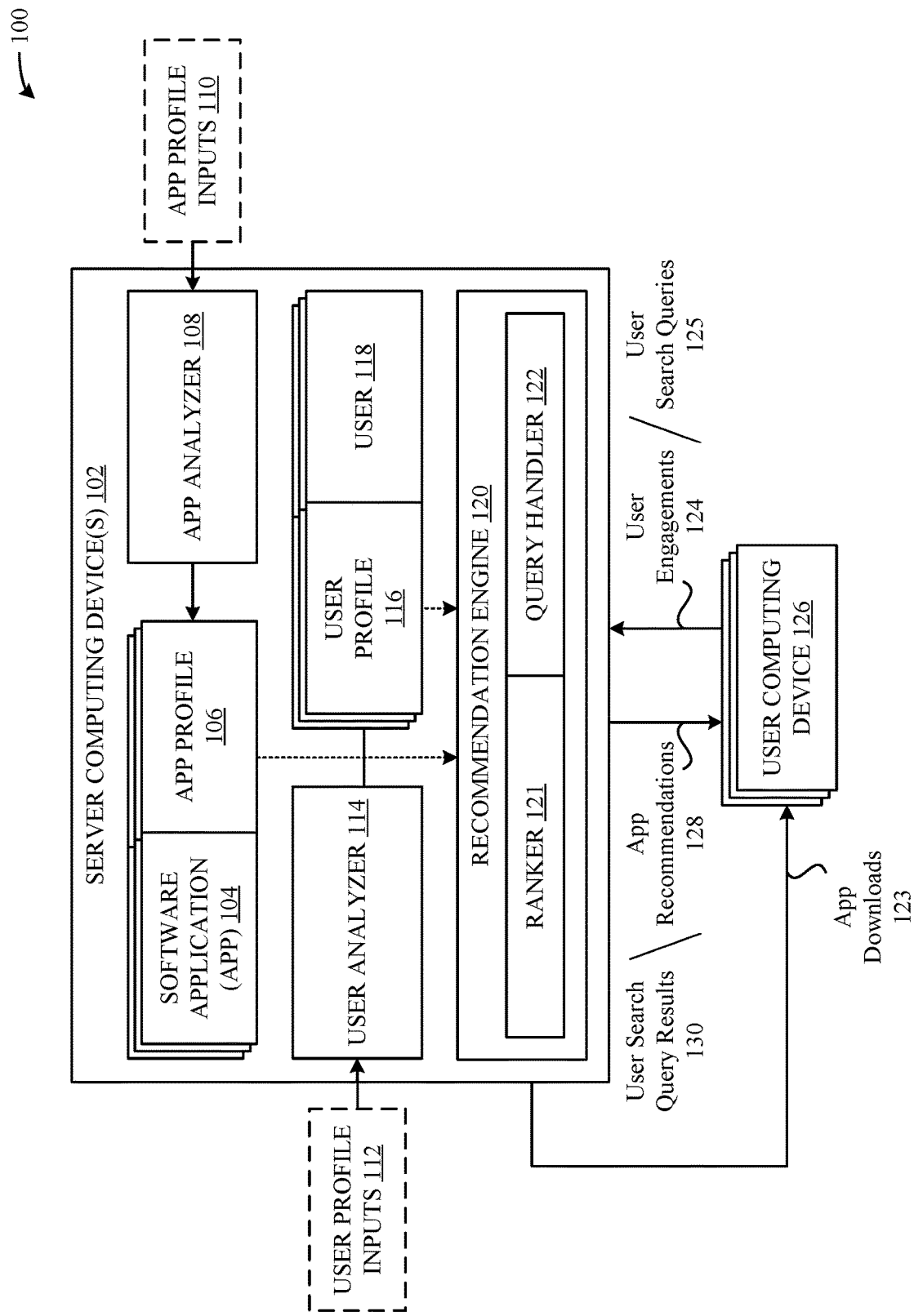
FIG. 1 illustrates a block diagram of different components of a system that can be configured to implement the various techniques described herein, according to some embodiments.

FIG. 1 illustrates a block diagram of different components of a system 100 that can implement the various techniques described herein, according to some embodiments. As shown in FIG. 1, the system 100 can include server computing devices 102 that enable users 118 of computing devices 126—e.g., smart phones, tablets, laptops, desktops, etc.—to access a software application store hosted by the server computing devices 102. According to some embodiments, the server computing devices 102 can be configured to manage various software applications 104 and make them available to be downloaded and installed onto the user computing devices 126 (represented in FIG. 1 as software application downloads 123). In some embodiments, the software application store implemented by the server computing devices 102 can enable software developers to upload software applications 104 to be made available through the software application store. Conversely, the user computing devices 126 can execute a counterpart software application—referred to herein as a software application store client—that enables the user computing devices 126 to interface with the software application store implemented by the server computing devices 102. For example, a software application store client (executing on a given user computing device 126) can enable a user 118 to browse for software applications 104 that he or she may be interested in downloading and installing, e.g., productivity software applications, social networking software applications, game software applications, and the like. In turn, when the user 118 identifies a particular software application 104 of interest, the software application store client can cause the user computing device 126 to download and install the software application 104 onto the user computing device 126 in a seamless manner. Subsequently, the user 118 can access the software application 104 on his or her user computing device 126.

According to some embodiments, and as described in greater detail herein, the server computing devices 102 can be configured to manage software application profiles 106 for the various software applications 104. In particular, a software application analyzer 108 can be configured to intake software application profile inputs 110 associated with a given software application 104—e.g., user engagements 124 associated with users 118 who access the software application 104, user search queries 125 that are associated with the software application 104, etc.—and perform a variety of analyses to establish/maintain a software application profile 106 that describes various aspects associated with the software application 104. A more detailed description of the software application analyzer 108 is provided below in conjunction with FIGS. 2A-2B. Additionally, the server computing devices 102 can also be configured to manage user profiles 116 for various users 118. In particular, a user analyzer 114 can be configured to intake user profile inputs 112—e.g., user engagements 124 associated with a user 118, user search queries 125 submitted by the user 118—and perform a variety of analyses to establish/maintain a user profile 116 that describes various aspects associated with the user 118. A more detailed description of the software application analyzer 108 is provided below in conjunction with FIGS. 3A-3E.

Additionally, and as shown in FIG. 1, the server computing devices 102 can implement a recommendation engine 120 that is configured to provide software application recommendations to the users 118 (e.g., by way of the software application store clients executing on their user computing devices 126). According to some embodiments, the recommendation engine 120—in particular, a ranker 121 implemented by the recommendation engine 120—can be configured to provide software application recommendations 128 to the user computing devices 126 when appropriate, e.g., when the software application store clients executing on the user computing devices 126 are preparing to display a user interface (UI) that includes recommendations for software applications 104 to download and install. In particular, the ranker 121 can generate software application recommendations 128 for a given user 118 by analyzing (1) the user profile 116 associated with the user 118, and (2) the software application profiles 106 associated with the software applications 104 managed by the server computing devices 102. A more detailed description of the recommendation engine 120/ranker 121 is provided below in conjunction with FIGS. 4A-4C. Additionally, the recommendation engine 120—in particular, the query handler 122—can be configured to deliver user search query results 130 to the user computing devices 126 when appropriate, e.g., when users 118 of the user computing devices 126 input search queries for software applications 104 that they are seeking to access. In particular, the query handler 122 can be configured to (1) receive user search queries 125 from a user 118 (operating a user computing device 126), and (2) provide user search query results 130 that are personalized based on a software application profile 106 associated with the user 118. A more detailed description of the recommendation engine 120/query handler 122 is provided below in conjunction with FIGS. 5A-5C.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another (e.g., using the Internet). A more detailed explanation of these hardware components is provided below in conjunction with FIG. 6. It should additionally be understood that the computing devices can include additional entities that enable the implementation of the various techniques described herein without departing from the scope of this disclosure. Is should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100—in particular, the server computing devices 102 and the user computing devices 126—can implement the various techniques described herein, according to some embodiments. A more detailed breakdown of the manner in which software application profiles 106 can be generated and maintained will now be provided below in conjunction with FIGS. 2A-2B.

Figure 2A:
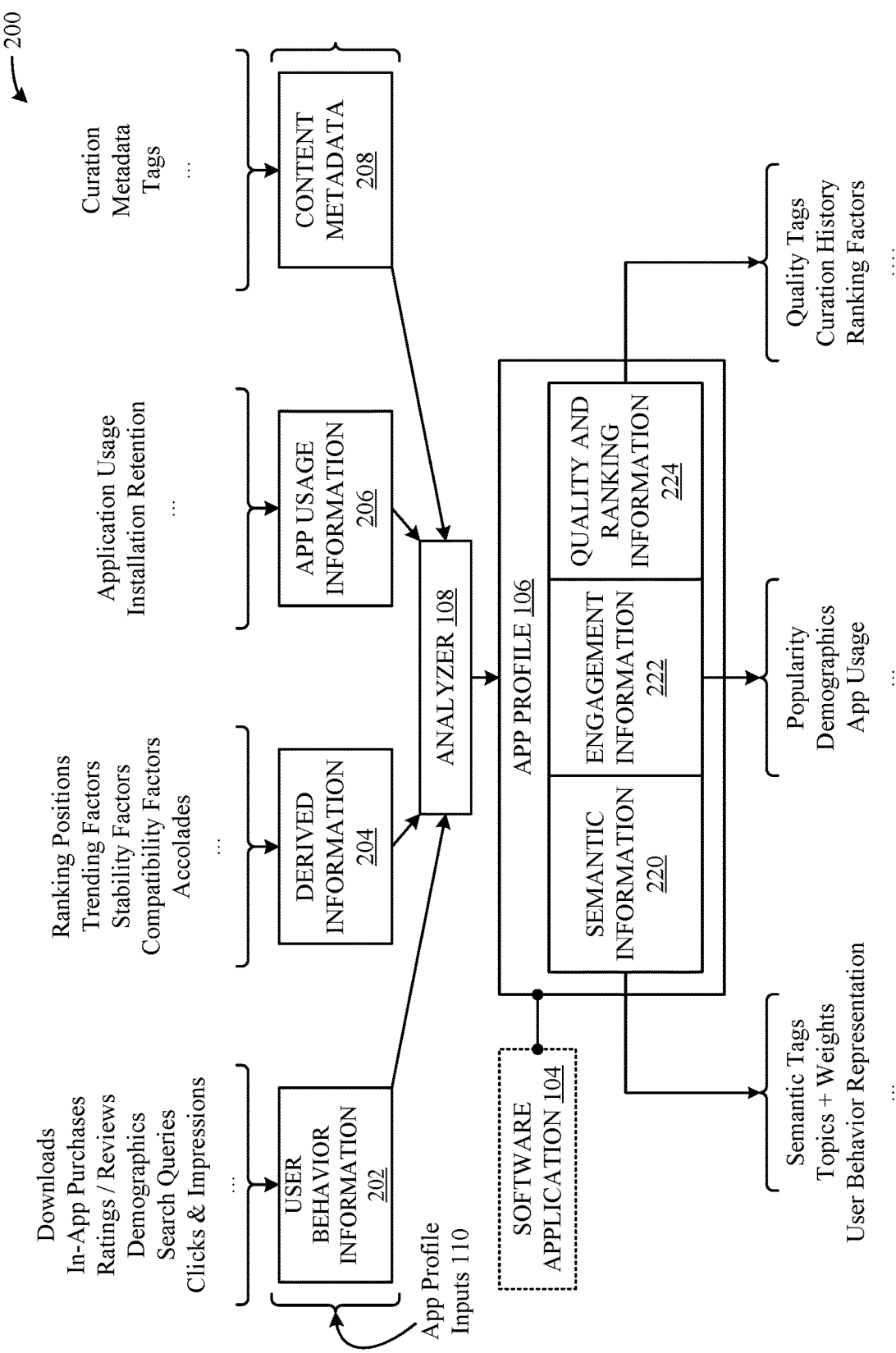
FIGS. 2A-2B illustrate conceptual diagrams of a manner in which software application profiles for software applications can be generated and maintained, according to some embodiments.

FIG. 2A illustrates a conceptual diagram 200 that captures a manner in which the software application analyzer 108 can generate/maintain a software application profile 106 for a software application 104, according to some embodiments. As shown in FIG. 2A, the process of generating/maintaining the software application profile 106 can involve gathering application profile inputs 110 associated with the software application profile 106. According to some embodiments, the software application profile inputs 110 can include user behavior information 202 associated with the software application 104, derived information 204 associated with the software application 104, software application usage information 206 associated with the software application 104, and content metadata 208 associated with the software application 104, which will now be described below in greater detail.

It is noted that the following discussions of the various informational items set forth in this disclosure is not meant to be limiting in any way. On the contrary, it should be appreciated that the discussions are merely exemplary, and that the informational items can include additional/related informational items that are not explicitly described in this disclosure. Additionally, it should be appreciated that the informational items can be gathered and analyzed at any level of granularity without departing from the scope of this disclosure. Further, it should be appreciated that the informational items can be aggregated to derive other informational items that are not explicitly described in this disclosure.

As shown in FIG. 2A, the user behavior information 202 can identify one or more of: downloads, in-app purchases, ratings/reviews, demographics, search queries, clicks/impressions, and so on, associated with the software application 104. According to some embodiments, the download information can encompass any information pertaining to the distribution of the software application 104 to the user computing devices 126. For example, the download information can identify a total number of unique users 118, user computing devices 126, etc., that have downloaded and installed the software application 104. The download information can also identify temporal information associated with the downloads, e.g., dates/times at which the downloads and installations occurred, the types of user computing devices 126 that downloaded and installed the software application 104, and so on. Additionally, the in-app purchase information can encompass any information pertaining to purchases that are made within the scope of the operation of the software application 104. For example, the in-app purchase information can identify the types of in-app purchases that are made, the revenue that they generate, and so on. Additionally, the rating/review information can encompass any feedback information provided by users 118 who have downloaded and installed the software application 104. For example, the review information can represent a rating that falls between one (1) and five (5), where a value for the rating represents an average of the rating values provided by the users 118. Additionally, the review information can represent written reviews submitted by the users 118 about their experience using the software application 104. Additionally, the demographic information can include various demographic information about the users 118 who have engaged with (i.e., viewed and/or downloaded and installed) the software application 104. For example, the demographic information can identify genders, ages, locales, and so on, of the users 118 who have engaged with the software application 104.

Additionally, the search query information can encompass a collection of search phrases that were submitted by users 118 and that led to the users 118 downloading and installing the software application 104 (referred to herein as a "conversion"). According to some embodiments, the search query information can be configured to only include search queries that reliably resulted in conversions, e.g., conversions that took place within a threshold period of time after the search queries were submitted, conversions that took place within a threshold number of user interface inputs (e.g., click inputs, touch inputs, etc.), and so on. Additionally, the click/impression information can encompass details about interactions the users 118 have with the software application 104 throughout any portion of their engagement with the software application 104. For example, the clicks information can identify interactions with the software application 104 by the users 118 when viewing the software application 104 in the software application store. Moreover, the impression information can include details about the overall engagement made by the users 118 when viewing the software application 104. For example, the impression information can identify a number of users 118 who viewed the software application 104 in the software application store relative to a number of users 118 who ended up downloading and installing the software application 104 as a result. Moreover, the impression information can identify aspects of how the users 118 were presented with the software application 104 in the software application store, e.g., through paid advertising, ranked lists, editorial areas (e.g., recommended software applications), category filters, and the like.

Accordingly, the user behavior information 202 can encompass a wealth of information about how the users 118 engage with the software application 104. Additionally, and as previously described herein, the software application profile inputs 110 can include derived information 204. According to some embodiments, the derived information 204 can include one or more of: ranking positions, trending factors, stability factors, compatibilities, accolades, and so on, associated with the software application 104. According to some embodiments, the ranking position information can encompass any information pertaining to different ranks in which the software application 104 is currently (or was) listed. For example, the ranking position information can identify one or more numerically ranked lists—e.g., top ten, top one-hundred, etc.—in which the software application 104 is currently (or was) listed. In another example, the ranking position information can identify one or more categorically-ranked lists—e.g., top games, top utilities, etc.—in which the software application 104 is currently (or was) listed. In yet another example, the ranking position information can identify one or more demographically ranked lists—e.g., top apps for men/women, top apps for kids/teenagers/students/adults/seniors, top apps in various locals, etc.—in which the software application 104 is currently (or was) listed.

According to some embodiments, the trending factor information can encompass any information pertaining to the current (or past) popularity of the software application 104. For example, the trending factor information can identify applications that are receiving an amount of attention that exceeds one or more thresholds, e.g., a number of queries associated with the software application 104, a number of views of the software application 104, a number of downloads and installations associated with the software application 104, and so on. In this example, the software application 104 can be labeled as (1) a trending software application when the numbers (individually/collectively) exceed a first threshold, (2) a breakout software application when the numbers (individually/collectively) exceed a second threshold, and so on.

According to some embodiments, the stability factor information can encompass any information pertaining to the current (or past) stability of the operation of the software application 104 on the user computing devices 126. For example, the stability factor information can encompass information that identifies when the software application 104 encounters operational issues, e.g., during the installation of the software application 104, during the operation of the software application 104, during the uninstallation of the software application 104, and so on. The operational issues can include, for example, processor, memory, and storage over-utilization, freezes that cause the software application 104 (or the user computing devices 126 themselves) to reset, and so on.

According to some embodiments, the compatibility information can encompass any information pertaining to the current (or past) compatibility that the software application 104 exhibits relative to the user computing devices 126. For example, the compatibility information can identify different types of the user computing devices 126 for which the software application 104 is optimized (e.g., smartphones and tablets). The compatibility information can also identify different versions of software compatibility associated with the software application 104—e.g., minimum version requirements for operating systems, firmware, etc., installed on the user computing devices 126 seeking to download and install the software application 104.

Additionally, the accolade information can encompass any information pertaining to the current (or past) awards that are associated with the software application 104. For example, the accolade information can identify different awards that are (or previously were) assigned to the software application 104 by way of engagement by the users 118 and/or by editors (e.g., administrators) who have been granted elevated access to the software application store. Moreover, the accolade information can identify different awards that are (or previously were) assigned to the software application 104 by way of milestones that were satisfied, e.g., when the software application 104 is the most downloaded and installed software application within the scope of a particular timeframe, when the software application 104 remains within a particular chart for a particular timeframe, and so on.

Accordingly, the derived information 204 can encompass a wealth of information about the general health of the software application 104 with respect to its reception by the users 118, editors associated with the software application store, its operational stability, and so on. Additionally, and as previously described herein, the software application profile inputs 110 can include software application usage information 206. According to some embodiments, the software application usage information 206 can include one or more of: a usage factor, an installation retention factor, and so on, associated with the software application 104. According to some embodiments, the usage factor information can encompass any information pertaining to the manner in which the users 118 engage with the software application 104. For example, the usage factor information can identify an average rate at which the software application 104 is loaded (e.g., once a day, twice a day, etc.) by the users 118, an average amount of time that the users 118 engage with the software application 104 after it is loaded, and so on. According to some embodiments, the installation retention factor information can encompass any information pertaining to installations of the software application 104 on the different user computing devices 126. For example, the installation retention factor information can identify an average rate of time that the software application 104 remains installed on the user computing devices 126, a percentage of installations that permit automatic updates to take place, version information associated with the installations, a total number of installations and uninstallations, and so on.

Accordingly, the software application usage information 206 can encompass a wealth of information about the general post-installation engagement that users 118 exhibit toward the software application 104 on their user computing devices 126. Additionally, and as previously described herein, the software application profile inputs 110 can include content metadata 208. According to some embodiments, the content metadata 208 can include on or more of: curation information, metadata information, tag information, and so on, associated with the software application 104. According to some embodiments, the curation information can encompass any information assigned to the software application 104 by editors who have elevated access to the software application store. For example, the curation information can include editorial reviews, editorial categorizations, etc., for the software application 104 that are submitted by the editors. According to some embodiments, the metadata information can encompass any information that describes the software application 104. For example, the metadata information can be submitted by developers of the software application 104 and include written descriptions, screenshots, and videos associated with the software application 104. According to some embodiments, the tag information can encompass any information that associates the software application 104 with relevant categories. For example, the tag information can indicate that the software application 104 belongs to a particular category (e.g., "dating," "games," "social," etc.). In another example, the tag information can indicate that the software application 104 is optimized for particular display screen sizes. It is noted that the tag information can be modified and/or supplemented by the editors to provide an additional level of context that can be utilized when generating the software application recommendations 128 described herein. In this regard, the content metadata 208 can be utilized to identify information about the software application 104 itself.

Accordingly, the software application profile inputs 110 provide a wealth of information that can be considered by the software application analyzer 108 when tasked with generating a software application profile 106 for the software application 104. According to some embodiments, the software application analyzer 108 can utilize any known technique for analyzing, aggregating, organizing, etc., the software application profile inputs 110 when generating the software application profile 106. According to some embodiments, and as described in greater detail below, the software application profile 106 can be configured to include semantic information 220, engagement information 222, and quality and ranking information 224.

According to some embodiments, the semantic information 220 can be generated using any of the software application profile inputs 110—e.g., developer-provided keywords, user engagement data (i.e., which software applications 104 are downloaded/used by individual users 118), and so on. According to some embodiments, the software application analyzer 108 can implement machine-learning to identify one or more topics that should be assigned to the software application 104. In particular, the topics can serve to effectively distill a considerable amount of information into a relatively small number of words that provide a meaningful breakdown of the nature of the software application 104. For example, the topics generated for a math tutoring software application can include "math," "number," "answer," "problem," "addition," "subtraction," "multiplication," "division," and so on. According to some embodiments, each topic can be associated with a different weight that represents an overall correlation strength of the topic relative to the software application 104. Additionally, the software application analyzer 108 can implement machine-learning to identify similarities that exist between the software application 104 and other software applications 104—e.g., using item-to-item analysis, clustering techniques, and the like. In turn, the software application analyzer 108 can generate the software application profile 106 based in part on the software application profiles 106 associated with the other software applications 104.

Accordingly, the semantic information 220 can be utilized to answer important questions about the software application 104. For example, the semantic information 220 can identify how the software application 104 relates to other software applications 104, search queries that are relevant to the software application 104, the types of users 118 who potentially would be interested in the software application 104, the functions that the software application 104 actually provides, and so on. In this regard, the semantic information 220 can enable the recommendation engine 120 to improve the level of personalization that is achieved when providing software application recommendations 128 to individual users 118.

Additionally, the semantic information 220 can enable editors to discover the software applications 104 in a more streamlined manner, especially when the semantic information 220 reveals intriguing properties about the software application 104 that should be investigated. In turn, and as previously described herein, the editors can assign additional information to the software application 104/software application profile 106. In particular, semantic tags—e.g., "dating," "meals," "news," "car," "food,", etc.,—can enable the software application 104 to achieve a level of attention within the software application store that is commensurate with the merits of the software application 104. Moreover, quality tags—e.g., "high-quality," "impressive," "inspiring," etc.—can also enable the software application 104 to achieve a level of attention within the software application store that is commensurate with the metrics of the software application 104. Given that these semantic/quality tags are provided by editors who presumably are affiliated with the software application store and operate in the best interest of the software application store, the tags beneficially are consistent, reliable, relevant, and interpretable. This aspect provides the non-obvious advantage of enabling introductory/independent software developers to achieve a footing within the software application store when appropriate, which normally can be difficult to accomplish given the sheer number of software applications 104 that are typically included within software application stores.

Additionally, and as previously described herein, the software application profile 106 can include engagement information 222. According to some embodiments, the engagement information 222 can also be utilized to answer important questions about the software application 104. For example, the engagement information 222 can include information about the types of users 118 who download and install the software application 104, how the users 118 utilize the software application 104 (e.g., contexts associated with their engagements, in-app purchases, etc.), how often the users 118 utilize the software application 104 (e.g., times per day, for how long, etc.), and so on.

Additionally, and as previously described herein, the software application profile 106 can include quality and ranking information 224. According to some embodiments, the quality and ranking information 224 can also be utilized to answer important questions about the software application 104. For example, the quality and ranking information 224 can indicate whether the developer of the software application 104 is trusted, whether there is a positive overall response rate from users 118 of the software application 104, and so on. Moreover, the quality and ranking information 224 can indicate whether the software application 104 is stable, whether the software application 104 adheres to the guidelines of the software application store, and so on. Additionally, the quality and ranking information 224 can include a set of scores that characterize the overall quality of the software application 104, including a curation history that maintains a record of past actions by editors (e.g., editorial accolades, semantic/quality tags, etc.). The quality and ranking information 224 can further include derived ranking factors that indicate an overall performance within the software application store.

Figure 2B:
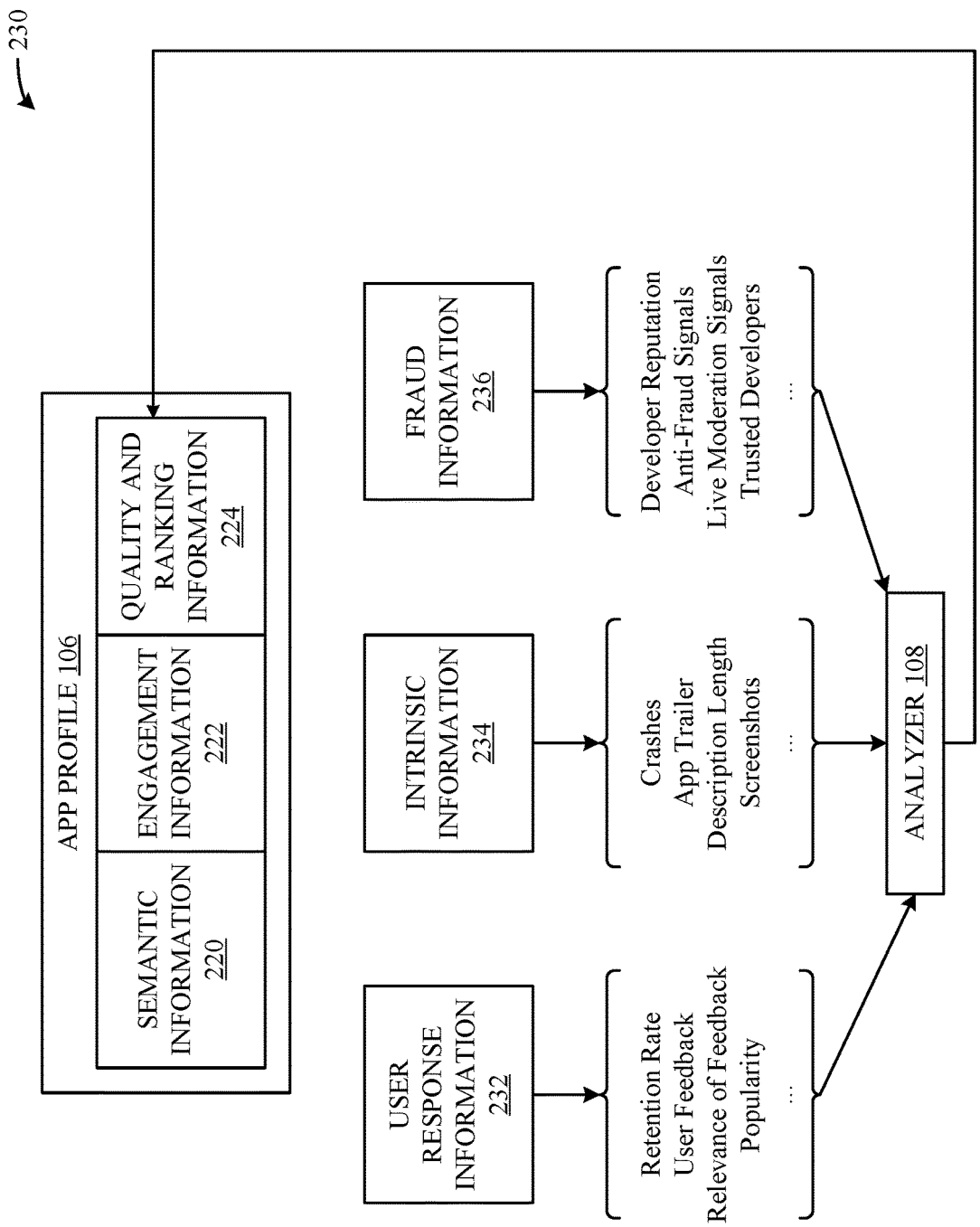

FIG. 2B illustrates a conceptual diagram 230 that captures a manner in which the software application analyzer 108 can generate the quality and ranking information 224 for the software application profile 106, according to some embodiments. As shown in FIG. 2B, the software application analyzer 108 can be configured to receive user response information 232, intrinsic information 234, and fraud information 236. According to some embodiments, the user response information 232 can include information that provides a complete picture of ratings and engagements associated with users 118 of the software application 104. For example, the user response information 232 can indicate a retention rate (as described herein), user feedback—i.e., ratings/reviews—for previous and current versions of the software application 104, a relevance of the feedback, an overall popularity of the software application 104 (as described herein), and so on. According to some embodiments, a variety of factors can be taken into account when determining the relevance of the feedback, e.g., whether the feedback is submitted by users who regularly utilize the software application 104, whether the feedback is relevant to overall function of the software application 104, and so on. For example, the software application analyzer 108 can be configured to identify bogus reviews submitted by "bots" that attempt to inject irrelevant information and/or unnecessarily drag down the overall standing of the software application 104 within the context of the software application store.

According to some embodiments, the intrinsic information 234 can include information that indicates whether the software application 104 is, overall, a polished and stable product that deserves attention. For example, the intrinsic information 234 can identify whether the software application 104 exceeds a crash rate that indicates a poor-quality design, whether the software application 104 has a video-based trailer that highlights the features of the software application 104, whether the software application 104 has screenshots that highlight the features of the software application 104, whether the software application 104 is associated with a cogent and meaningful description, and so on.

According to some embodiments, the fraud information 236 can include information that indicates whether the software application 104 is one that can be trusted by the software application store and the users 118. For example, the fraud information 236 can identify a reputation status— e.g., good, bad, unknown, etc.—that has been assigned to the developer of the software application 104 by the software application store (or other parties trusted by the software application store). Moreover, the fraud information 236 can include information about fraud claims that have been received in association with the software application 104, e.g., fraud claims generated by the users 118, fraud claims generated by entities that conduct business with the developer of the software application 104, and so on. Additionally, the fraud information 236 can include information about ongoing moderations performed by the server computing devices 102 (or other entities) to detect fraud. For example, the server computing devices 102 (or other entities) can identify suspicious payment transactions, user privacy concerns, and so on, which is reflected within the fraud information 236. Additionally, the fraud information 236 can include information about whether the developer of the software application 104 is known as a trusted developer within the software application store, e.g., a partner company, a large-scale/well-known company, and so on.

Accordingly, FIGS. 2A-2B provide a detailed breakdown of the manner in which software application profiles 106 can be generated and maintained by the server computing devices 102. As previously described herein, the recommendation engine 120 can utilize the software application profiles 106—along with user profiles 116—to generate the software application recommendations 128 to the users 118. Accordingly, a more detailed breakdown of the manner in which user profiles 116 can be generated and maintained will now be provided below in conjunction with FIGS. 3A-3E.

Figure 3A:
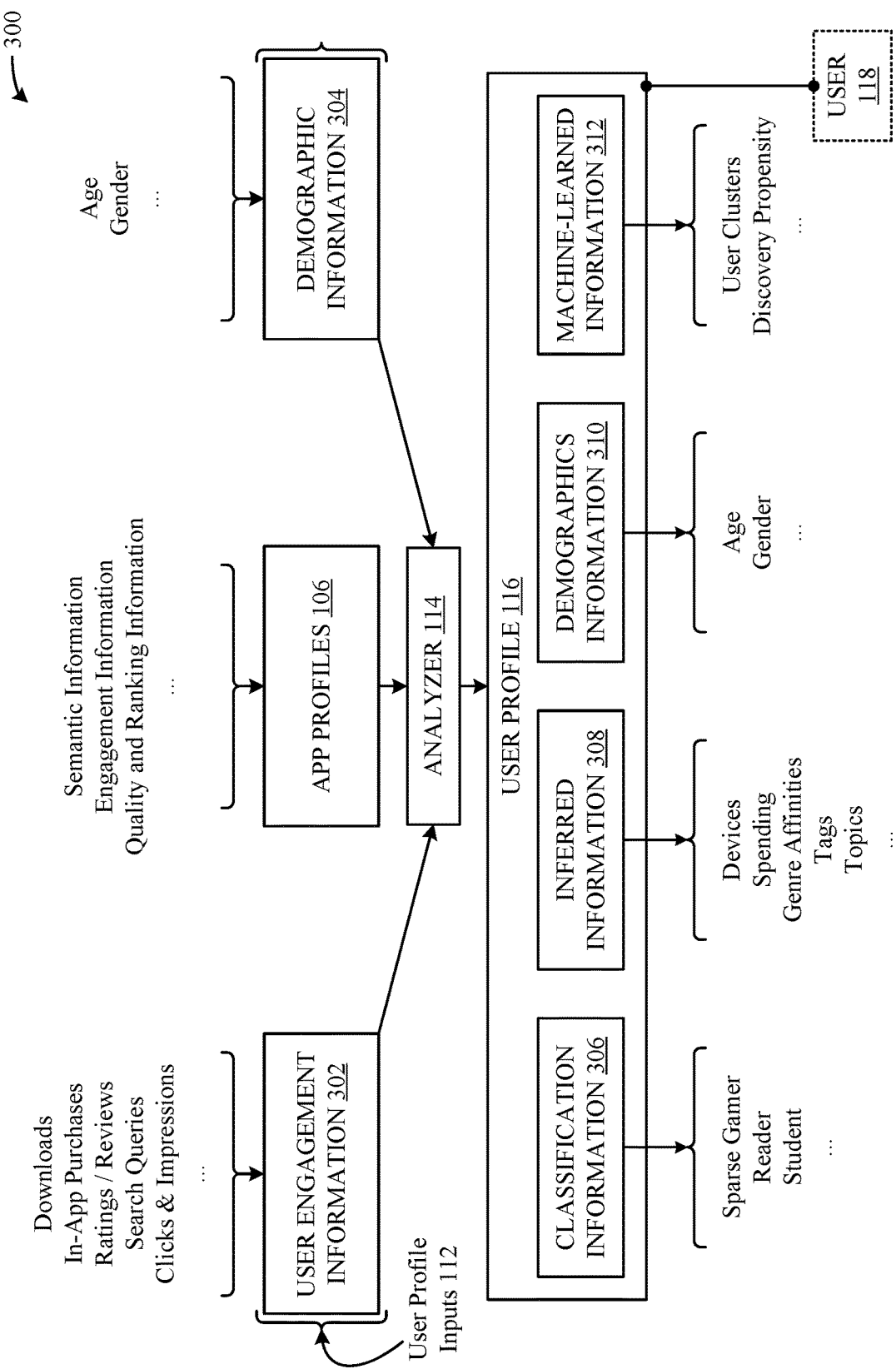

FIG. 3A illustrates a conceptual diagram 300 that captures a manner in which the user analyzer 114 can generate/maintain a user profile 116 for a user 118, according to some embodiments. According to some embodiments, the user profile 116 can function as a repository for personalization-related information about the user 118. As shown in FIG. 3A, the process of generating/maintaining the user profile 116 can involve gathering user profile inputs 112 associated with the user 118. According to some embodiments, the user profile inputs 112 can include user engagement information 302 associated with the user 118, software application profiles 106 associated with the software applications 104 engaged by the user 118, and demographics information 304 associated with the user 118, which will now be described below in greater detail.

As shown in FIG. 3A, the user engagement information 302 can identify one or more of: downloads, in-app purchases, ratings/reviews, demographics, search queries, clicks/impressions, and so on, associated with the user 118. Notably, the same descriptions of these terms provided above in conjunction with FIG. 2A can be applied within the scope of FIG. 3A. However, is noted that within the scope of FIG. 3A, these terms apply to a single user 118 interacting with multiple software applications 104, in contrast to multiple users 118 interacting with a single software application 104 (as in FIG. 2A). As shown in FIG. 3A, the software application profiles 106 can correspond to the different software applications 104 with which the user has engaged. As previously described herein, the software application profiles 106 can include the semantic information 220, the engagement information 222, and the quality and ranking information 224 described above in FIG. 2A. Additionally, the demographics information 304 can encompass information about the user 118—e.g., age, gender, etc. (as described herein)—for which the software application profile 106 is being generated.

According to some embodiments, and as shown in FIG. 3A, the user profile 116 can include classification information 306, inferred information 308, demographics information 310, and machine-learned information 312. According to some embodiments, the classification information 306 can identify one or more behavioral categories to which the user 118 corresponds. For example, when the user analyzer 114 identifies that the user 118 is interested in all forms of gaming software applications, the classification information 306 can indicate that the user 118 is a "sparse gamer." In another example, when the user analyzer 114 identifies that the user 118 is interested in electronic book (eBook) software applications, the classification information 306 can indicate that the user 118 is a "reader." In yet another example, when the user analyzer 114 identifies that the user 118 is interested in study aid software applications, the classification information 306 can indicate that the user 118 is a "student." Additionally, it is noted that the different classifications can be associated with particular weights to indicate an overall correlation strength that the user 118 exhibits toward the classifications.

According to some embodiments, the inferred information 308 can include one or more of: device information pertaining to user computing devices 126 associated with the user 118, spending information exhibited by the user 118, information about software application genre affinities exhibited by the user 118, tags (e.g., semantic, quality, etc.) associated with the software applications 104 with which the user 118 engages, topics associated with the software applications 104 with which the user 118 engages, and so on. According to some embodiments, the device information can encompass any information pertaining to the user computing devices 126 associated with the user 118. For example, the device information can indicate that the user 118 owns a tablet computing device, a smartphone computing device, and a laptop computing device, which are all linked to the same software application store account associated with the user 118. According to some embodiments, the spending information can encompass any information pertaining to the software applications 104 that the user purchases, in-app purchases made by the user 118, device purchases made by the user 118 (e.g., additional user computing devices 126), and so on. According to some embodiments, the information about software application genre affinities exhibited by the user 118 can encompass any information pertaining to the software applications 104 with which the user 118 engages. For example, the information can identify software applications 104 that are most-utilized by the user 118, compile the list of genres associated with the software applications 104, and rank the list of genres in accordance with their overall relevance to the user 118 (e.g., based on engagement information). According to some embodiments, the tags and topics information can encompass any information pertaining to the tags and topics associated with the software applications 104 with which the user 118 engages. For example, the information can identify software applications 104 that are most-utilized by the user 118, compile lists for the tags and topics associated with the software applications 104, and rank the lists in accordance with their overall relevance to the user's 118 engagement.

According to some embodiments, the demographics information 310 can include one or more of: age information associated with the user 118, or gender information associated with the user 118. It is noted that the foregoing demographics are not meant to represent an exhaustive list, and that the demographics information 310 can encompass other information about the user 118 without departing from the scope of this disclosure.

According to some embodiments, the machine-learned information 312 can include information that the user analyzer 114 is able to derive about the user 118 through machine-learning analyses. According to some embodiments, the machine-learned information 312 can include information about how the user 118 can be clustered (i.e., grouped) with other users 118 depending on different aspects of the users 118 that are being compared, the details of which are described below in conjunction with FIGS. 3B-3E. According to some embodiments, the machine-learned information 312 can also include information about whether the user 118 exhibits a propensity to discover new software applications 104 that fall outside of his or her normal interests. For example, the user analyzer 114 can correlate a high propensity of discovery to the user 118 when he or she exhibits historical engagement behavior with a large number of software applications 104 that span a variety of genres, payment models (e.g., paid/free apps), and so on. In contrast, the user analyzer 114 can correlate a low discovery propensity to the user 118 when he or she exhibits historical engagement behavior with a small number of software applications 104 that span a single genre and payment model.

As noted above, FIGS. 3B-3E detail how the machine-learned information 312 can generate useful information through clustering techniques. In particular, FIG. 3B illustrates this notion in an example scenario 330, in which a user 118 associated with a user profile 116-1 is grouped among other users 118 that share similarities in at least one aspect (e.g., genre affinities). For example, the users 118 grouped within the cluster 332-1—which include the user 118 and other users 118—can represent a group of individuals who have exhibited a highest number of downloads to a gaming genre. In this regard, the user analyzer 114 can derive useful information from the user profiles 116 associated with the other users 118. In this regard, the user profile 116-1 for the user 118 can, in part, be based one or more of the user profiles 116 associated with the other users 118. In another example, the users 118 grouped into the cluster 332-2 can represent a group of individuals who have exhibited a highest number of downloads to a science genre. In yet another example, the users 118 grouped into the cluster 332-3 can represent a group of individuals who have exhibited a highest number of downloads to a sports genre. It is noted that various filters can be applied to enhance the overall accuracy by which the users 118 are grouped in order to increase their relevancy to one another. For example, the genre-based groupings described herein can be configured to disregard downloads that correspond to software applications 104 that were highly ranked at the time the downloads were performed, as such downloads can inappropriately skew the download counts and decrease the overall relevance of the groupings. It is additionally noted that the users 118 can be grouped based on any aspect without departing from the scope of this disclosure. For example, the users 118 can be grouped based on their spending habits, based on their locales, their demographics, and so on, and at any level of granularity.

Figure 3C:
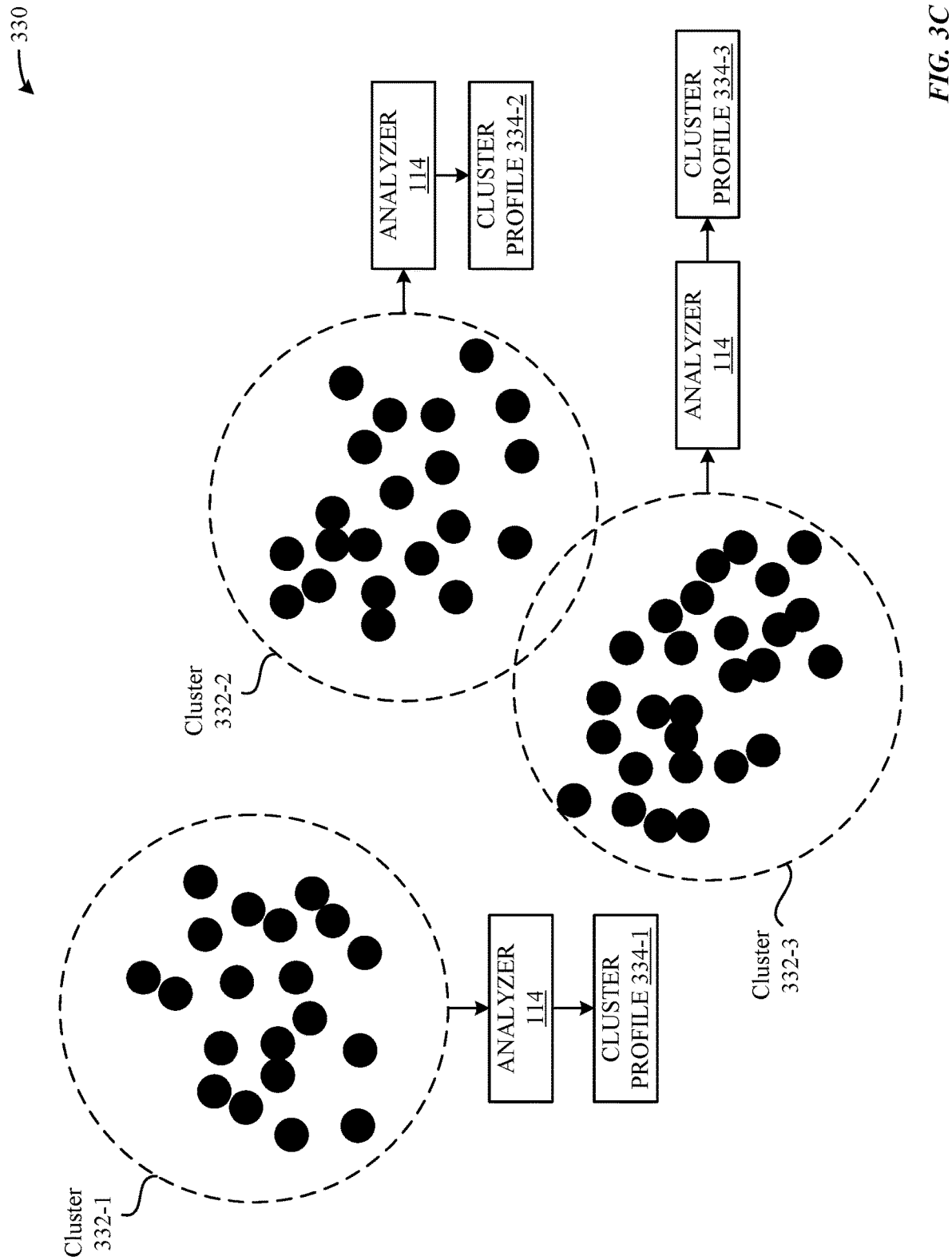

Additionally, and as shown in FIG. 3C, the user analyzer 114 can be configured to utilize the clustering techniques described herein to establish cluster profiles 334 for each of the clusters 332. In particular, a cluster profile 334 for a given cluster 332 can represent an aggregation of the user profiles 116 associated with the users 118 who are grouped within the cluster 332. Accordingly, as shown in FIG. 3C, the user analyzer 114 can, for each cluster 334 into which the user 118 is grouped, establish a cluster profile 334—or update an existing cluster profile 334—and add the user profile 116-1 associated with the user 118 to the cluster profile 334-1. According to some embodiments, each cluster profile 334 can include references to the user profiles 116 (of the users 118 belonging to the cluster profile 334) so that copies of the user profiles 116 do not need to be redundantly stored to be associated with the cluster profile 334. This notion is illustrated in FIG. 3E by the user profile references 342. In turn, the cluster profiles 334 can be correlated to their respective clusters 332, which is represented in FIG. 3D by the cluster profile assignments 336-1, 336-2, and 336-3.

Figure 3D:
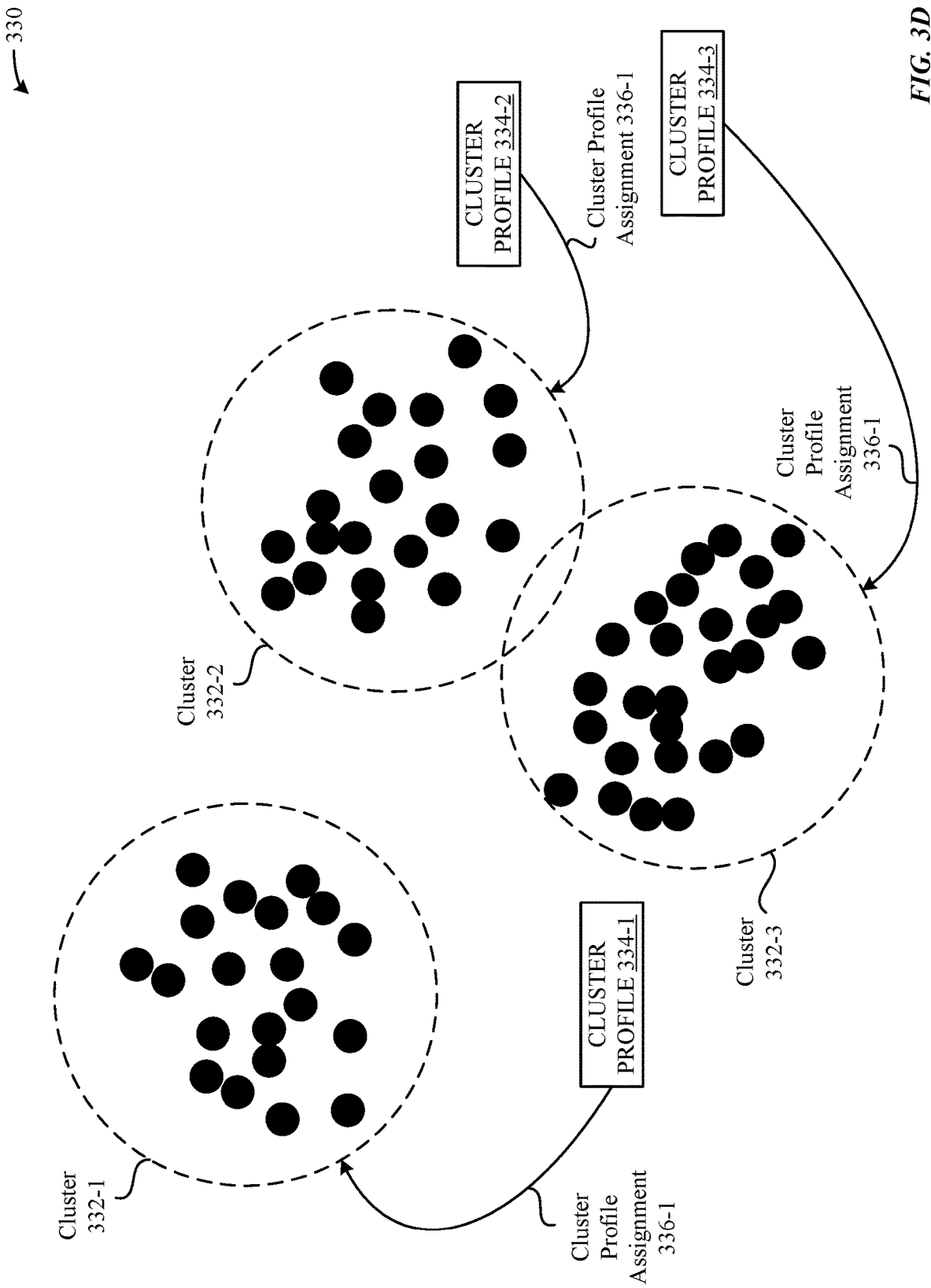
Figure 3E:
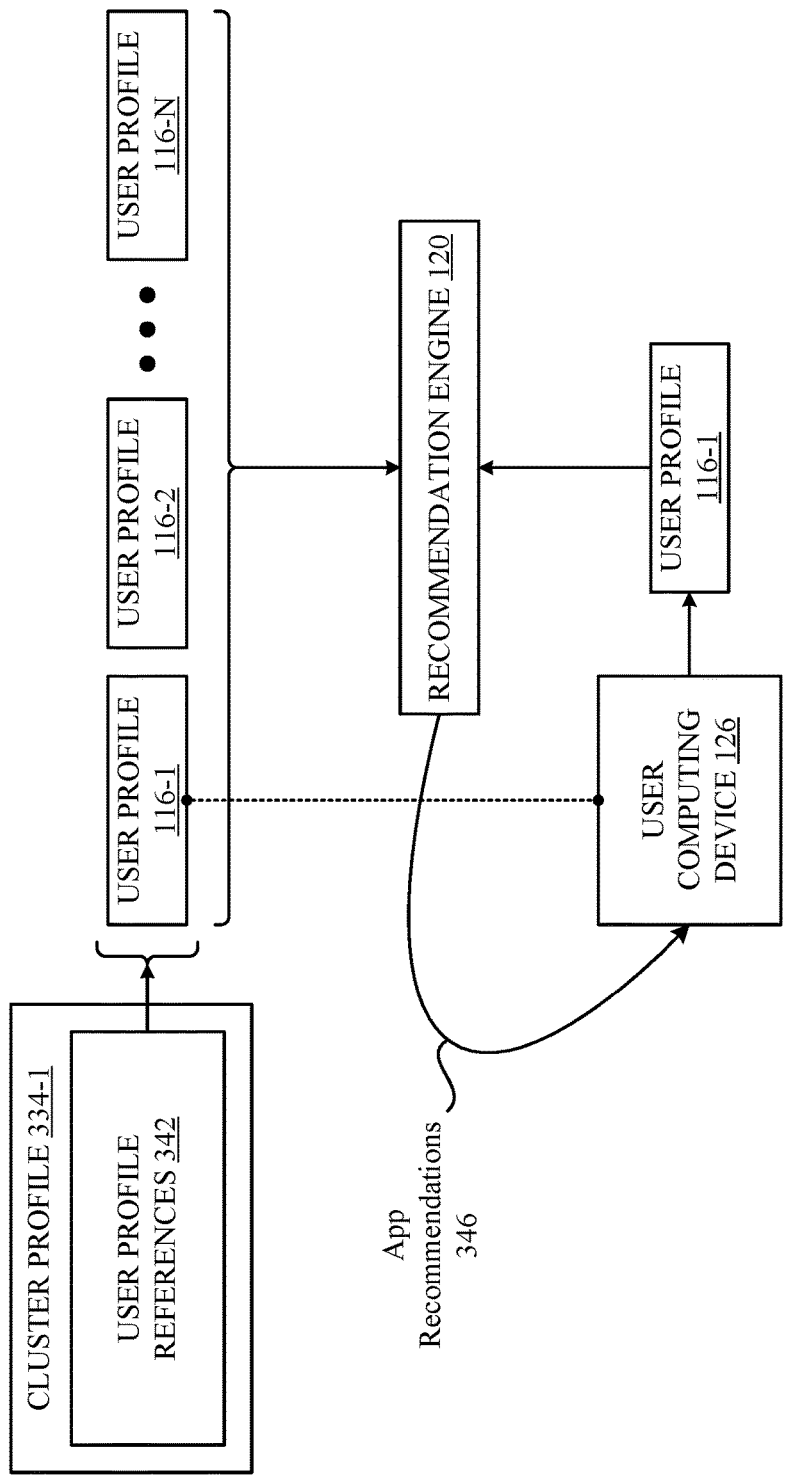

Turning now to FIG. 3E, an example scenario 340 is illustrated in which the cluster profile 334-1 can be utilized to generate relevant software application recommendations 128 (illustrated as software application recommendations 346 in FIG. 3E) to the user 118—who, by way of FIGS. 3B-3D, belongs to the cluster profile 334-1. As shown in FIG. 3E, the recommendation engine 120 can receive a request from the user 118—in particular, from a user computing device 126 being operated by the user 118—for software application recommendations 346 that are based on the inclusion of the user 118 within the cluster profile 334-1. As shown in FIG. 3E, the request can include the user profile 116-1 (or information about the user 118 that can be used to locate the user profile 116-1), where, in turn, the recommendation engine 120 identifies that the user profile 116-1 is a member of the cluster profile 334-1. Next, the recommendation engine 120 analyzes the other user profiles 116 associated with the cluster profile 334-1 (by way of the user profile references 342) and identifies, based on the other user profiles 116, software applications 104 with which the user 118 might be interested in engaging. For example, the recommendation engine 120 can identify new software applications 104 that are being engaged by a threshold number of the users 118 belonging to the cluster profile 334-1. In turn, the recommendation engine 120 can filter out any of the new software applications 104 that have already been engaged by the user 118, and provide the remaining new software applications 104—if any—via the software application recommendations 346.

Accordingly, FIGS. 3A-3E provide a detailed breakdown of the manner in which user profiles 116 can be generated and utilized to form cluster profiles 334, according to some embodiments. Additionally, and as previously described herein, the recommendation engine 120 can be configured to provide software application recommendations 128 to a user 118 by utilizing (1) his or her user profile 116, and (2) the software application profiles 106 of the software applications 104 managed by the server computing device 102. Accordingly, a more detailed breakdown of these features will now be provided below in conjunction with FIGS. 4A-4C.

Figure 4A:
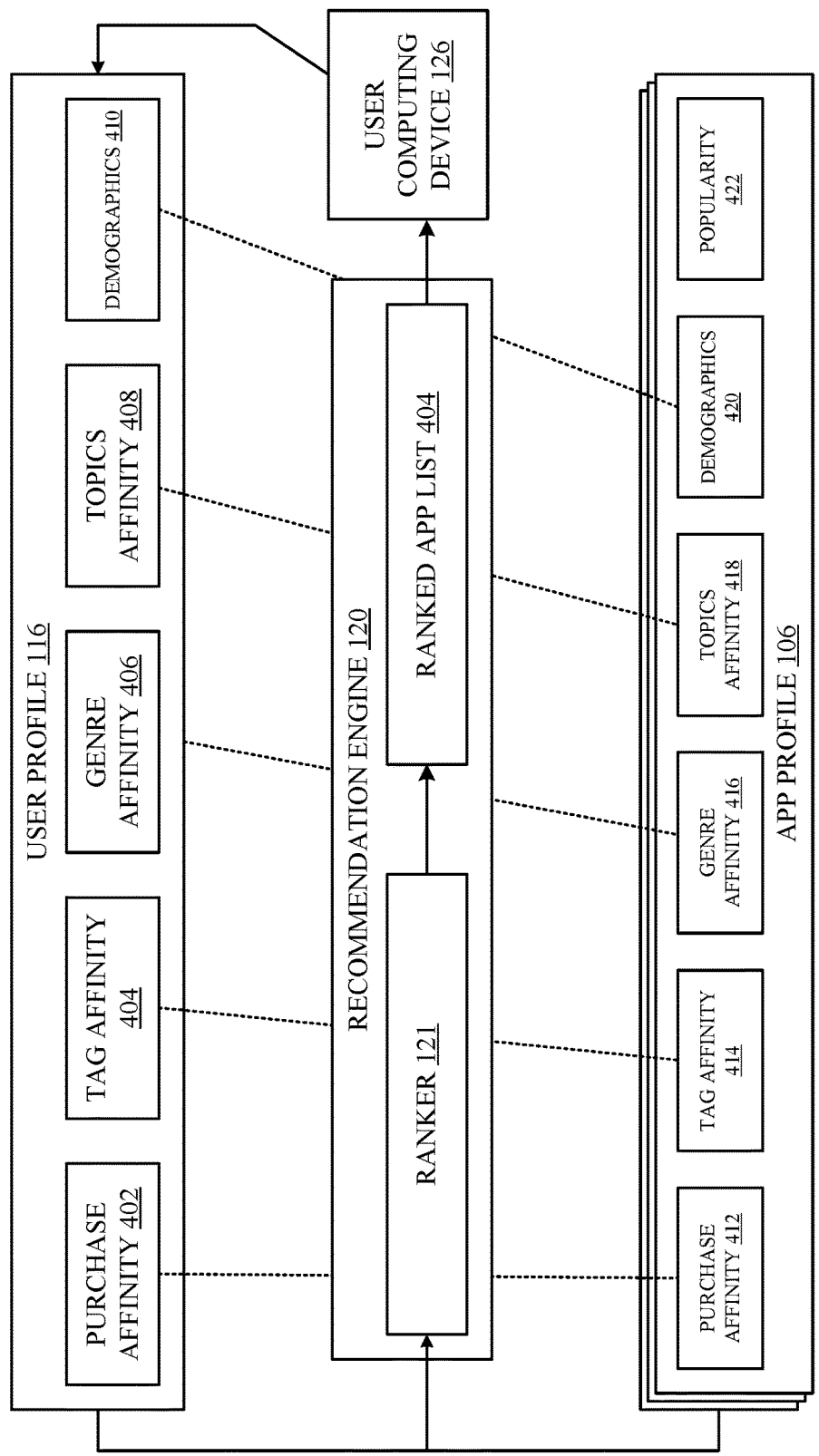
FIGS. 4A-4C illustrate conceptual diagrams and a method that detail how software application profiles and user profiles can be utilized to generate personalized software application recommendations for users, according to some embodiments.

FIG. 4A illustrates a conceptual diagram 400 that captures a manner in which the recommendation engine 120 can provide software application recommendations 128 to a user 118 of a user computing device 126, according to some embodiments. As shown in FIG. 4A, various aspects of the user profile 116 associated with the user 118 can be analyzed by the recommendation engine 120 in conjunction with generating the software application recommendations 128. According to some embodiments, the user profile 116 can be identified by the recommendation engine 120 in response to receiving a request from a user computing device 126 (associated with the user 118/user profile 116) for an up-to-date list of software application recommendations 128. This can occur, for example, when a software application store client executing on the user computing device 126 is loaded and is seeking to display software application recommendations 128.

As shown in FIG. 4A, the aspects of the user profile 116 that are analyzed by the ranker 121 can include a purchase affinity 402, a tag affinity 404, a genre affinity 406, a topics affinity 408, and demographics 410. Similarly, the ranker 121 can be configured to analyze various aspects of software application profiles 106 in conjunction with generating the software application recommendations 128. For example, the aspects can include a purchase affinity 412 that correlates to the purchase affinity 402 (of the user profile 116), a tag affinity 414 that correlates to the tag affinity 404 (of the user profile 116), a genre affinity 416 that correlates to the genre affinity 406 (of the user profile 116), a topics affinity 418 that correlates to the topics affinity 408 (of the user profile 116), demographics 420 that correlate to the demographics 410 (of the user profile 116), and a popularity 422. Notably, the descriptions of the foregoing terms provided above in conjunction with FIGS. 2A-2B and 3A-3E can be applied within the scope of FIG. 4A. It is additionally noted that the information included within the user profile 116 and the software application profiles 106 is exemplary, and that any of the information described herein, in any capacity, can be considered within the context of the user profile 116/software application profiles 106 without departing from the scope of this disclosure.

According to some embodiments, the ranker 121 can be configured to analyze the information included within the user profile 116 and the software application profiles 106 using any known analytical techniques in order to identify software applications 104 that are most relevant to the user 118 within a particular contextual scope. For example, the ranker 121 can implement machine-learning techniques when comparing the various information to identify correlations that can lead to the generation of relevant software application recommendations 128. In some embodiments, each of the correlated information pairs illustrated in FIG. 4A—e.g., the purchase affinity 402/purchase affinity 412, the tag affinity 404/tag affinity 414, etc.—can be associated with weights that affect the overall impact that each correlated information pair has with respect to generating the software application recommendations 128. The analysis performed by the ranker 121 results in the generation of a ranked software application list 404, which can subsequently be provided to the user computing device 126 in the form of software application recommendations 128. In turn, and as shown in the conceptual diagram 430 of FIG. 4B, the user computing device 126 can display a user interface that reflects the software application recommendations 128. In the example illustrated in FIG. 4B, the user 118 exhibits affinities—e.g., in decreasing strengths—toward the categories "games," "kids," and "news." In this regard, the user interface can display the most relevant software applications 104 within each of the categories, in accordance with the software application recommendations 128. It is noted that the user interface illustrated in FIG. 4B is exemplary, and that the user computing device 126 can be configured to display the software application recommendations 128, in any form and at any level of granularity, within the user interface without departing from the scope of this disclosure.

Figure 4B:
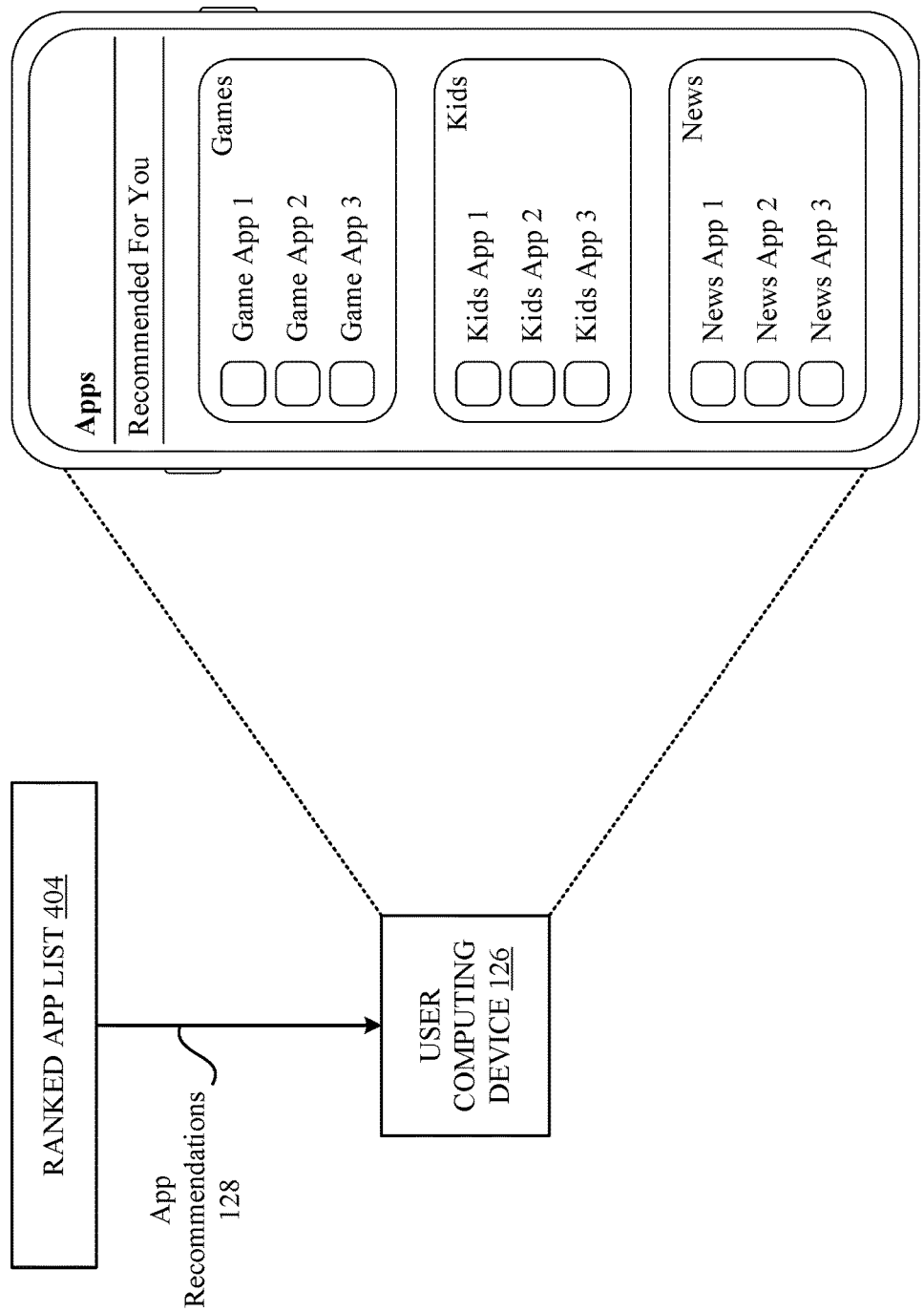
Figure 4C:
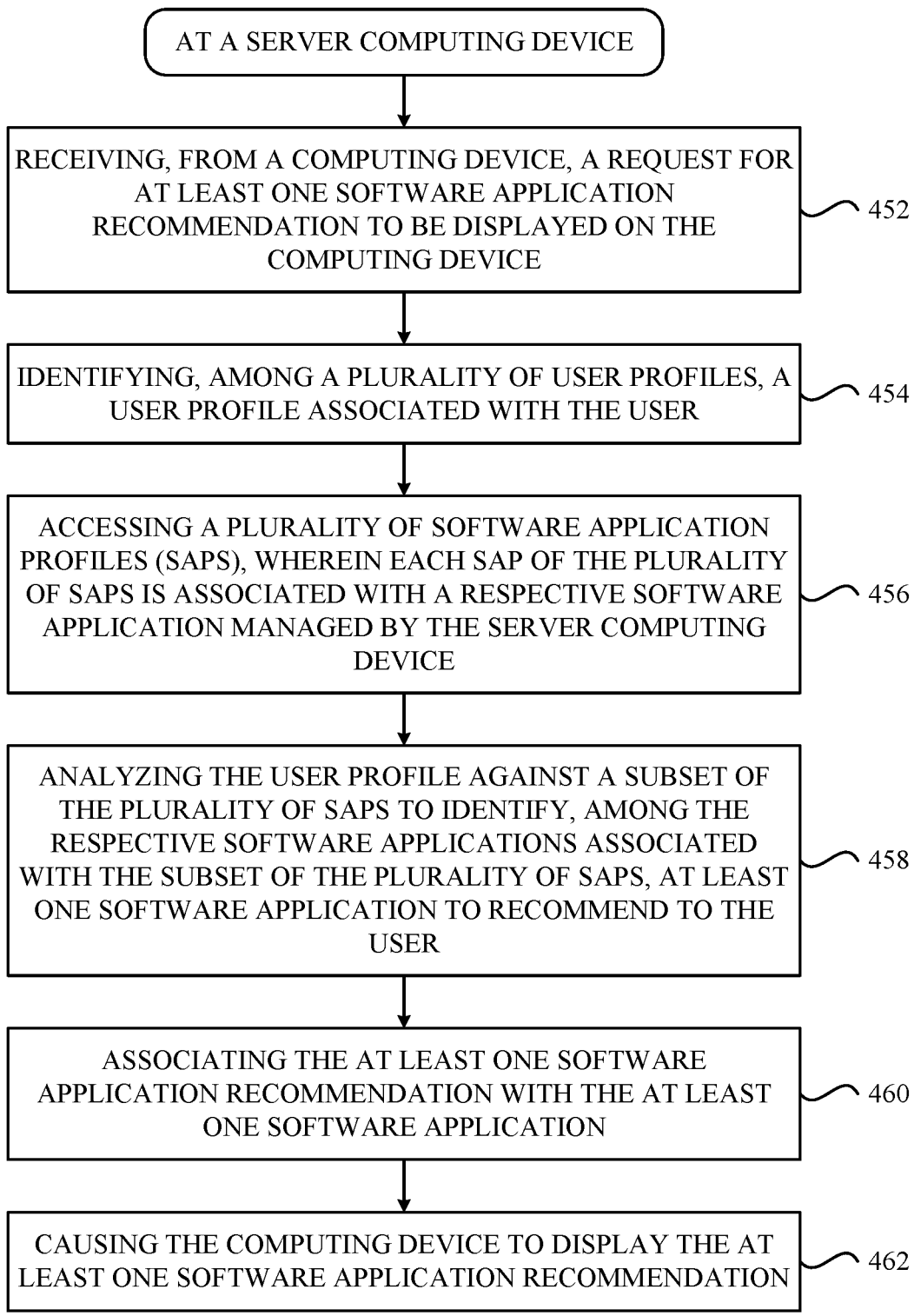

Additionally, FIG. 4C illustrates a method 450 for causing a computing device to display software application recommendations that are relevant to a user of the computing device, according to some embodiments. In particular, the method 450 functions as a high-level overview of the techniques that can be implemented by the recommendation engine 120 to generate software application recommendations 128 for a particular user 118. As shown in FIG. 4C, the method 450 can be implemented by the server computing device 102, and begins at step 452, where the recommendation engine 120 receives, from a computing device, a request for at least one software application recommendation to be displayed on the computing device (e.g., as described above in conjunction with FIG. 4A). At step 454, the recommendation engine 120 identifies, among a plurality of user profiles, a user profile associated with the user (e.g., as also described above in conjunction with FIG. 4A).

At step 456, the recommendation engine 120 accesses a plurality of software application profiles (SAP), wherein each SAP of the plurality of SAPs is associated with a respective software application managed by the server computing device (e.g., as also described above in conjunction with FIG. 4A). At step 458, the recommendation engine 120 analyzes the user profile against a subset of the plurality of SAPs to identify, among the respective software applications associated with the subset of the plurality of SAPs, at least one software application to recommend to the user (e.g., as also described above in conjunction with FIG. 4A). At step 460, the recommendation engine 120 associates the at least one software application recommendation with the at least one software application (e.g., as also described above in conjunction with FIG. 4A). At step 462, the recommendation engine 120 causes the computing device to display the at least one software application recommendation (e.g., as described above in conjunction with FIG. 4B).

Accordingly, FIGS. 4A-4C provide a detailed breakdown of the manner in which the recommendation engine 120 can be configured to provide software application recommendations 128 to a user 118 by utilizing (1) his or her user profile 116, and (2) the software application profiles 106 of the software applications 104 managed by the server computing device 102. Additionally, and as previously described herein, the recommendation engine 120 can also be configured to (1) receive user search queries 125 from a user 118 (operating a user computing device 126), and (2) provide user search query results 130 that are personalized based on a software application profile 106 associated with the user 118. Accordingly, a more detailed breakdown of these features will now be provided below in conjunction with FIGS. 5A-5C.

Figure 5A:
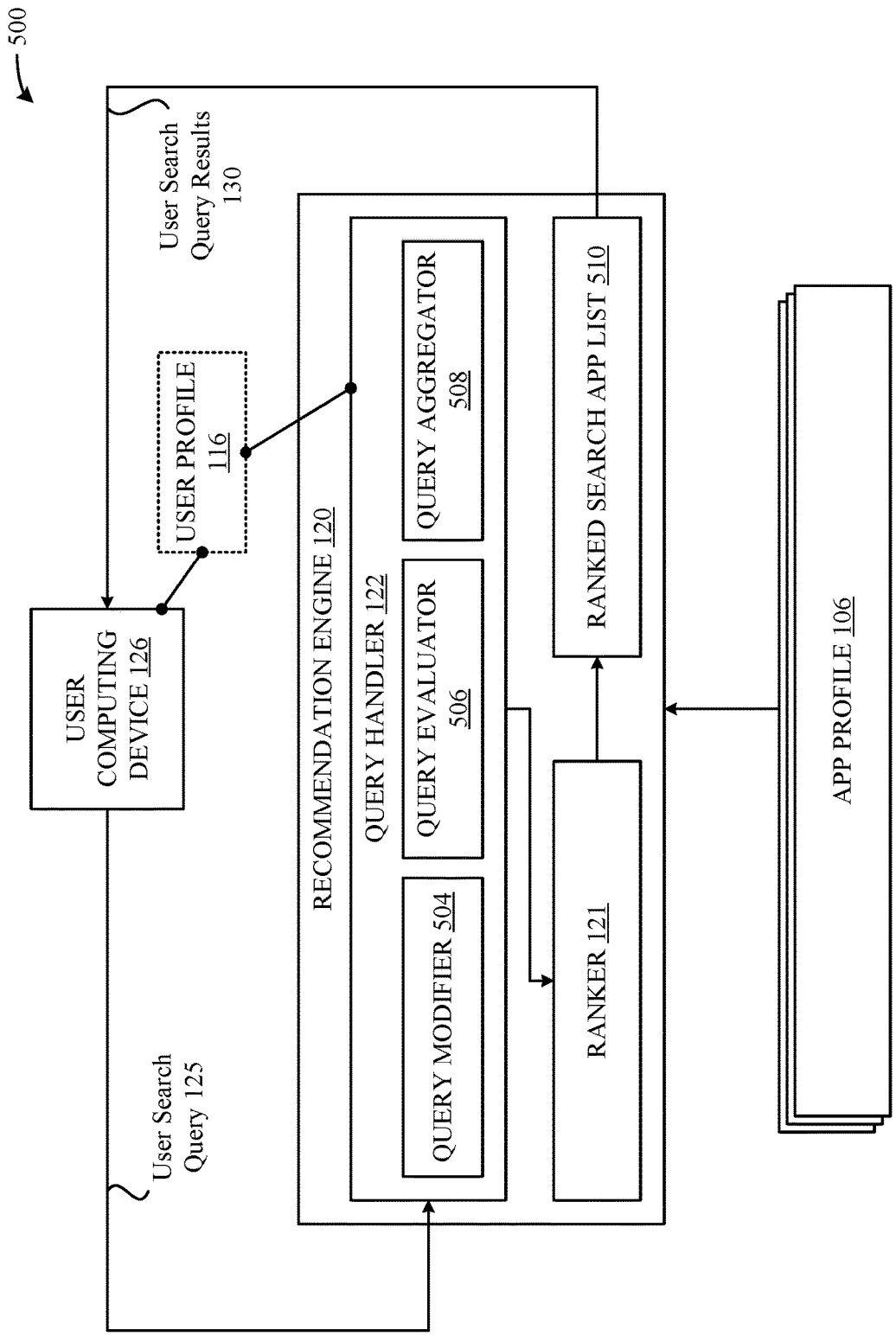
FIGS. 5A-5C illustrate conceptual diagrams and a method that detail how software application profiles and user profiles can be utilized to generate personalized search query results for users, according to some embodiments.

FIG. 5A illustrates a conceptual diagram 500 that captures a manner in which the recommendation engine 120—in particular, the query handler 122—can provide user search query results 130 that are personalized to a user 118 of a user computing device 126, according to some embodiments. As shown in FIG. 5A, the query handler 122 can receive a user search query 125 from a user computing device 126. The user search query 125 can be generated by the user computing device 126 in accordance of a variety of events, e.g., the user 118 entering text input, voice command input, mouse/keyboard input, touch input, and the like. In turn, the query handler 122 can perform a series of operations that enable the recommendation engine 120 to generate search results that are personalized to the user 118, as opposed to delivering generic search results that would otherwise match all search results provided in response to the same user search query 125.

As shown in FIG. 5A, a query modifier 504 can be configured to modify the user search query 125 where and when appropriate. For example, the query modifier 504 can be configured to modify the user search query 125 based on a spell-check that is performed. In another example, the query modifier 504 can be configured to modify the user search query 125 based on the user profile 116 associated with the user 118. In particular, the query modifier 504 can be configured to add, modify, or remove words from the user search query 125 in the interest of generating user search query results 130 that are more relevant to the user 118. For example, when the user profile 116 identifies that (1) the user 118 exhibits a strong propensity toward gaming software applications 104, and (2) the user search query 125 includes words that generally are affiliated with games—e.g., "battle," "multiplayer," "team," etc.—the query modifier 504 can be configured to add the word "game"/"gaming"/"games" to the user search query 125. In this regard, the modified user search query 125 will naturally narrow the search results to include gaming software applications 104 that are more likely to be relevant to the user search query 125 submitted by the user 118.

According to some embodiments, the modified user search query 125 can be provided to a query evaluator 506 and a query aggregator 508 to generate search results that include software application profiles 106 that are relevant to the modified user search query 125. In particular, the query evaluator 506 can be configured to retrieve software application profiles 106 that are relevant to the modified user search query 125, and provide the software application profiles 106 to the query aggregator 508. In turn, the query aggregator 508 can filter the software application profiles 106 prior to delivering them to the ranker 121. For example, the query aggregator 508 can be configured to apply any business rules, filters, and so on, to narrow the software application profiles 106 that are provided to the ranker 121. The ranker 121 can then re-order the software application profiles 106 based on the behavior profile of the user 118 (e.g., in a manner similar to the techniques described above in FIGS. 4A-4C), and provide, to the user computing device 126 a ranked search software application list 510 (that functions as the user search query results 130).

Figure 5B:
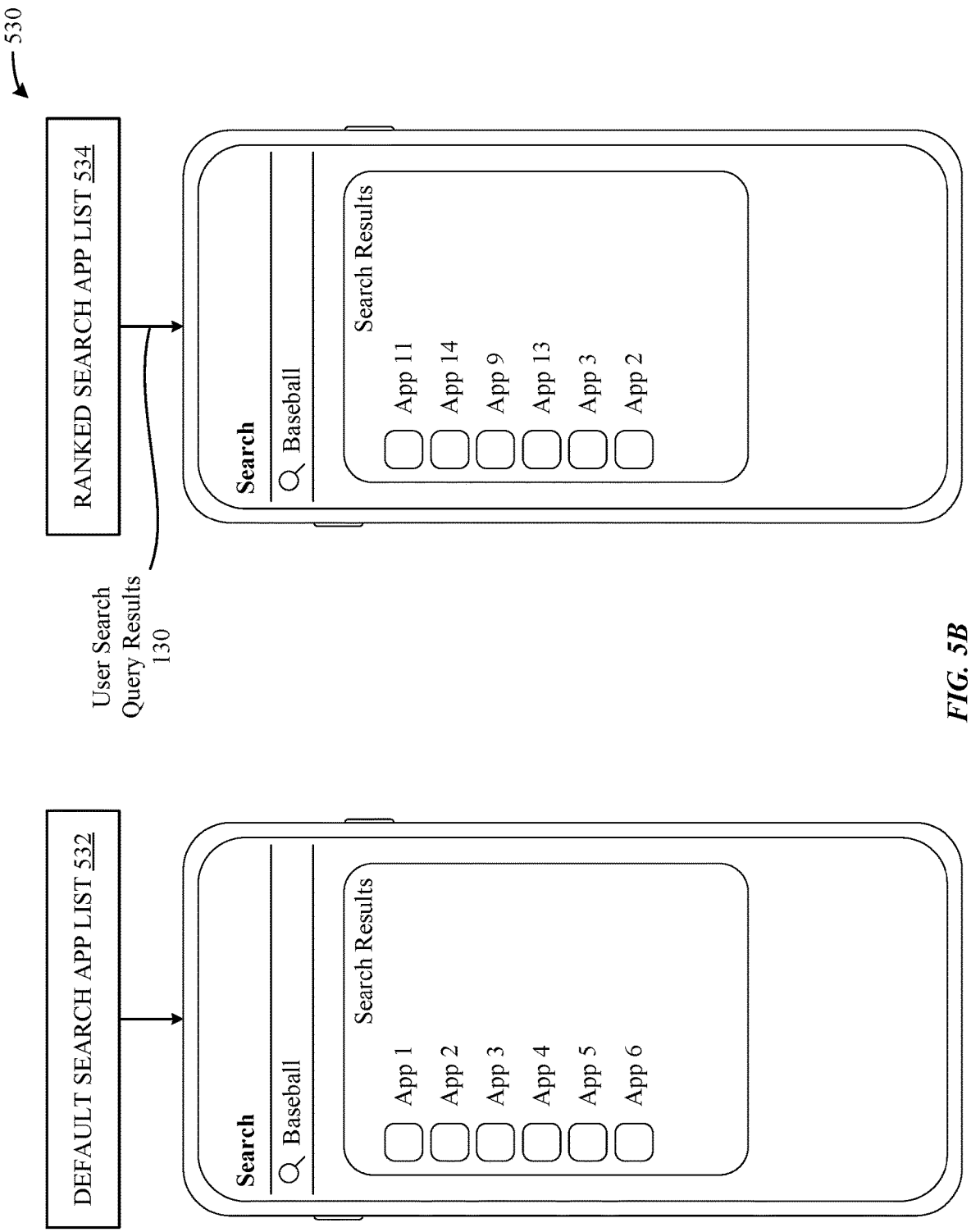

FIG. 5B illustrates a conceptual diagram 530 that highlights the differences between a default search software application list 532 and a ranked search application list 534 that are generated in response to a user search query 125. In particular, the default search software application list 532 represents search results that are returned for the user search query 125 "Baseball" when the user search query 125 is not modified in conjunction with FIG. 5A (and FIG. 5C, described below). As a result, the search results include six different software applications 104 in an ascending order. In contrast, the ranked search application list 534 represents search results that are returned for the same user search query 125 "Baseball" when the user search query 125 is modified in accordance with the techniques described above in conjunction with FIG. 5A (and FIG. 5C, described below). Notably, the search results returned in accordance with the ranked search software application list 534 can be highly distinct from the search results returned in accordance with the default search software application list 532, and presumably are more relevant to the user 118 given that the search results returned in accordance with the ranked search software application list 534 are tailored in accordance with the behavioral aspects of the user 118.

Figure 5C:
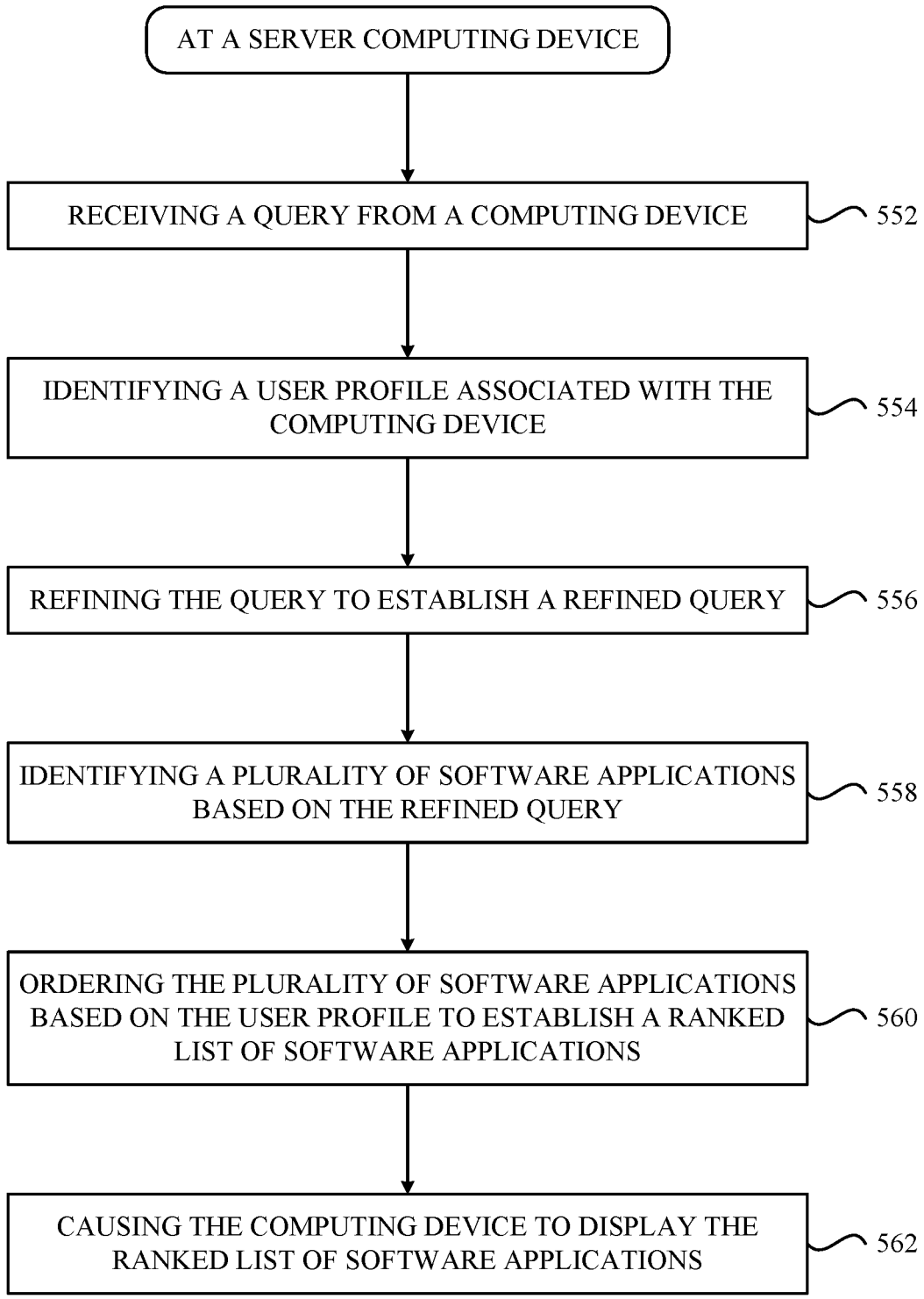

Additionally, FIG. 5C illustrates a method 550 for refining software application search results based on a user profile associated with a user of a computing device, according to some embodiments. In particular, the method 550 functions as a high-level overview of the techniques that can be implemented by the recommendation engine 120 to refine software application search results based on a user profile 116 associated with a particular user 118. As shown in FIG. 5C, the method 550 can be implemented at a server computing device 102, and begins at step 552, where the recommendation engine 120 receives a query from a computing device (e.g., as described above in conjunction with FIG. 5A). At step 554, the recommendation engine 120 identifies a user profile associated with the computing device (e.g., as also described above in conjunction with FIG. 5A). At step 556, the recommendation engine 120 refines the query to establish a refined query (e.g., as also described above in conjunction with FIG. 5A). At step 558, the recommendation engine 120 identifies a plurality of software applications based on the refined query (e.g., as also described above in conjunction with FIG. 5A). At step 560, the recommendation engine 120 orders the plurality of software applications based on the user profile to establish a ranked list of software applications (e.g., as also described above in conjunction with FIG. 5A). At step 562, the recommendation engine 120 causes the computing device to display the ranked list of software applications (e.g., as described above in conjunction with FIG. 5B).

Figure 6:
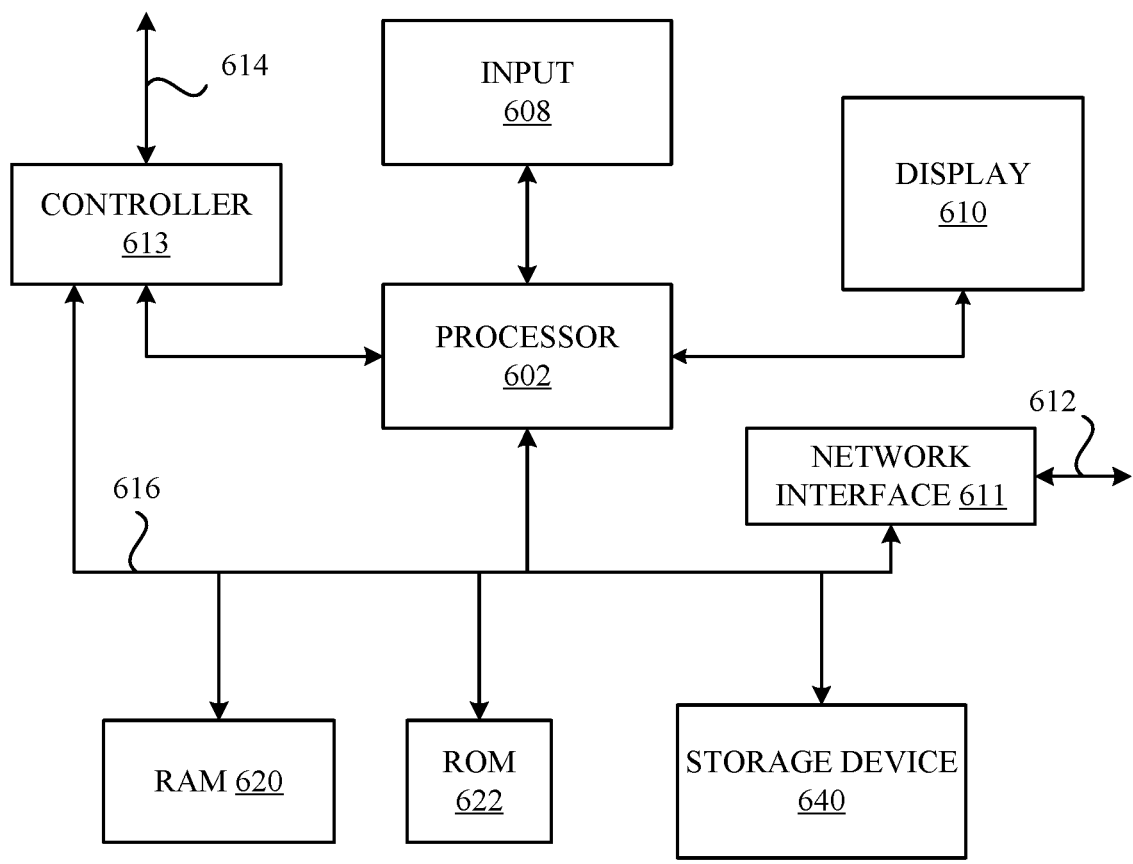
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the server computing devices 102 and the user computing devices 126 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., SSDs), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve the relevance of software application recommendations that are provided to users. The present disclosure contemplates that in some instances, this gathered data may include personal information data that uniquely identifies or can be used to contact or locate a specific person. Such personal information data can include demographics data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted software applications that are of greater interest to the user. Accordingly, use of such personal information data enables users to calculate the control of the targeted software applications. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of software application recommendations, the present technology can be configured to allow users to select to "opt in" or "opt out" of participation in the collection of personal information data during registration for services or anytime thereafter. In another example, users can select to provide only certain types of data that contribute to the targeted software application recommendations. In addition to providing "opt in" and "opt out" options, the present disclosure contemplates providing notifications relating to the access or use of personal information. For instance, a user may be notified upon downloading a software application—e.g., the software application store client described herein—that their personal information data will be accessed and then reminded again just before personal information data is accessed by the software application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, software application recommendations can be selected and delivered to users by inferring preferences based on non-personal information data or a bare minimum amount of personal information, such as the content being requested by the device associated with a user, other non-personal information available, or publicly available information.

What is claimed is:

1. A method for causing a computing device to display software application recommendations that are relevant to a user of the computing device, the method comprising, at a server computing device:

receiving, from the computing device, a request for at least one software application recommendation to be displayed on the computing device, wherein the request includes content on which to base a search of available software applications;

identifying, among a plurality of user profiles, a user profile associated with the user, wherein each user profile of the plurality of user profiles is associated with a plurality of properties;

altering the content of the request based on information derived at least in part from the user profile to generate a modified request that includes altered content;

accessing, based on the altered content of the modified request, a plurality of software application profiles (SAPs), wherein each SAP of the plurality of SAPs:

(1) is associated with a respective software application managed by the server computing device, (2) includes at least respective properties that correspond to the plurality of properties included in the user profiles, and (3) is generated and maintained based at least in part on interactions between users and the respective software application installed across computing devices of the users;

analyzing the plurality of properties of the user profile against the respective properties of each SAP in a subset of the plurality of SAPs to identify, among the respective software applications associated with the subset of the plurality of SAPs, at least one software application to recommend to the user;

associating the at least one software application recommendation with the at least one software application; and causing the computing device to display the at least one software application recommendation.

2. The method of claim 1, wherein the subset of the plurality of SAPs omits SAPs associated with respective applications that were previously displayed as recommended software applications to the user within a threshold period of time.

3. The method of claim 1, wherein the server computing device implements machine-learning when analyzing the user profile against the subset of the plurality of SAPs.

4. The method of claim 1, further comprising:

receiving, from a software developer, a second request to register a new software application with the server computing device;

over a threshold period of time, gathering information about one or more of:
  user interaction information associated with the new software application,
  derived information associated with the new software application,
  usage information associated with the new software application, or
  metadata information associated with the new software application;

generating, for the new software application, an associated new SAP based on the information; and adding the new SAP to the plurality of SAPs.

5. The method of claim 4, wherein:

the user interaction information identifies one or more of: downloads, in-app purchases, ratings/reviews, demographics, search queries, or clicks/impressions associated with the new software application;

the derived information identifies one or more of: ranking positions, a trending factor, a stability factor, compatibilities, or accolades associated with the new software application;

the usage information identifies one or more of: a usage factor or an installation retention factor associated with the new software application; and the metadata information identifies one or more of: curation information, metadata information, or tag information associated with the new software application.

6. The method of claim 1, further comprising:

receiving, from a new computing device, a second request to register a new user with the server computing device;

adding, to the plurality of user profiles, a new user profile associated with the new user;

over a threshold period of time, gathering information about one or more of:
  engagements by the new user with a plurality of software applications, or
  demographics associated with the new user; and updating the new user profile based on the information.

7. The method of claim 6, wherein:

the engagements by the new user identify one or more of: downloads, in-app purchases, ratings/reviews, search queries, or clicks/impressions; and the demographics associated with the new user include one or more of: a gender, or an age.

8. The method of claim 1, further comprising, prior to causing the computing device to display the at least one software application recommendation:

ordering the at least one software application recommendation based on the user profile to establish a ranked list of software applications.

9. At least one non-transitory computer readable storage medium configured to store instructions that, when executed by at least one processor included in a server computing device, cause the server computing device to cause a computing device to display software application recommendations that are relevant to a user of the computing device, by carrying out steps that include:

receiving, from the computing device, a request for at least one software application recommendation to be displayed on the computing device, wherein the request includes content on which to base a search of available software applications;

identifying, among a plurality of user profiles, a user profile associated with the user, wherein each user profile of the plurality of user profiles is associated with a plurality of properties;

altering the content of the request based on information derived at least in part from the user profile to generate a modified request that includes altered content;

accessing, based on the altered content of the modified request, a plurality of software application profiles (SAPs), wherein each SAP of the plurality of SAPs:

(1) is associated with a respective software application managed by the server computing device, (2) includes at least respective properties that correspond to the plurality of properties included in the user profiles, and (3) is generated and maintained based at least in part on interactions between users and the respective software application installed across computing devices of the users;

analyzing the plurality of properties of the user profile against the respective properties of each SAP in a subset of the plurality of SAPs to identify, among the respective software applications associated with the subset of the plurality of SAPs, at least one software application to recommend to the user;

associating the at least one software application recommendation with the at least one software application; and causing the computing device to display the at least one software application recommendation.

10. The at least one non-transitory computer readable storage medium of claim 9, wherein the steps further include:

receiving, from a software developer, a second request to register a new software application with the server computing device;

over a threshold period of time, gathering information about one or more of:
  user interaction information associated with the new software application, derived information associated with the new software application,
usage information associated with the new software application, or
metadata information associated with the new software application;
generating, for the new software application, an associated new SAP based on the information; and
adding the new SAP to the plurality of SAPs.

11. The at least one non-transitory computer readable storage medium of claim 10, wherein:
the user interaction information identifies one or more of: downloads, in-app purchases, ratings/reviews, demographics, search queries, or clicks/impressions associated with the new software application;
the derived information identifies one or more of: ranking positions, a trending factor, a stability factor, compatibilities, or accolades associated with the new software application;
the usage information identifies one or more of: a usage factor or an installation retention factor associated with the new software application; and
the metadata information identifies one or more of: curation information, metadata information, or tag information associated with the new software application.

12. The at least one non-transitory computer readable storage medium of claim 9, wherein the steps further include:
receiving, from a new computing device, a second request to register a new user with the server computing device;
adding, to the plurality of user profiles, a new user profile associated with the new user;
over a threshold period of time, gathering information about one or more of:
engagements by the new user with a plurality of software applications, or
demographics associated with the new user; and
updating the new user profile based on the information.

13. The at least one non-transitory computer readable storage medium of claim 12, wherein:
the engagements by the new user identify one or more of: downloads, in-app purchases, ratings/reviews, search queries, or clicks/impressions; and
the demographics associated with the new user include one or more of: a gender, or an age.

14. The at least one non-transitory computer readable storage medium of claim 9, wherein the steps further include, prior to causing the computing device to display the at least one software application recommendation:
ordering the at least one software application recommendation based on the user profile to establish a ranked list of software applications.

15. A server computing device configured to cause a computing device to display software application recommendations that are relevant to a user of the computing device, the server computing device comprising:
at least one processor; and
at least one memory storing instructions that, when executed by the at least one processor, cause the server computing device to carry out steps that include:
receiving, from the computing device, a request for at least one software application recommendation to be displayed on the computing device, wherein the request includes content on which to base a search of available software applications;
identifying, among a plurality of user profiles, a user profile associated with the user, wherein each user profile of the plurality of user profiles is associated with a plurality of properties;
altering the content of the request based on information derived at least in part from the user profile to generate a modified request that includes altered content;
accessing, based on the altered content of the modified request, a plurality of software application profiles (SAPs), wherein each SAP of the plurality of SAPs:
(1) is associated with a respective software application managed by the server computing device,
(2) includes at least respective properties that correspond to the plurality of properties included in the user profiles, and
(3) is generated and maintained based at least in part on interactions between users and the respective software application installed across computing devices of the users;
analyzing the plurality of properties of the user profile against the respective properties of each SAP in a subset of the plurality of SAPs to identify, among the respective software applications associated with the subset of the plurality of SAPs, at least one software application to recommend to the user;
associating the at least one software application recommendation with the at least one software application; and
causing the computing device to display the at least one software application recommendation.

16. The server computing device of claim 15, wherein the at least one processor further causes the server computing device to:
receive, from a software developer, a second request to register a new software application with the server computing device;
over a threshold period of time, gather information about one or more of:
user interaction information associated with the new software application,
derived information associated with the new software application,
usage information associated with the new software application, or
metadata information associated with the new software application;
generate, for the new software application, an associated new SAP based on the information; and
add the new SAP to the plurality of SAPs.

17. The server computing device of claim 16, wherein:
the user interaction information identifies one or more of: downloads, in-app purchases, ratings/reviews, demographics, search queries, or clicks/impressions associated with the new software application;
the derived information identifies one or more of: ranking positions, a trending factor, a stability factor, compatibilities, or accolades associated with the new software application;
the usage information identifies one or more of: a usage factor or an installation retention factor associated with the new software application; and
the metadata information identifies one or more of: curation information, metadata information, or tag information associated with the new software application.

18. The server computing device of claim 15, wherein the at least one processor further causes the computing device to:

receiving, from a new computing device, a second request to register a new user with the server computing device;

adding, to the plurality of user profiles, a new user profile associated with the new user;

over a threshold period of time, gathering information about one or more of:

engagements by the new user with a plurality of software applications, or demographics associated with the new user; and updating the new user profile based on the information.

19. The server computing device of claim 18, wherein:

the engagements by the new user identify one or more of: downloads, in-app purchases, ratings/reviews, search queries, or clicks/impressions; and the demographics associated with the new user include one or more of: a gender, or an age.

20. The server computing device of claim 15, wherein the at least one processor further causes the server computing device to, prior to causing the computing device to display the at least one software application recommendation:

order the at least one software application recommendation based on the user profile to establish a ranked list of software applications.

* * * * *